US009255790B2

(12) United States Patent
Zhu

(10) Patent No.: US 9,255,790 B2
(45) Date of Patent: Feb. 9, 2016

(54) WIDE ANGLE BISTATIC SCANNING OPTICAL RANGING SENSOR

(75) Inventor: Xiang Zhu, Richmond (CA)

(73) Assignee: Neptec Design Group LTD., Kanata, ON (CA)

(*) Notice: Subject to any disclaimer, the term of this patent is extended or adjusted under 35 U.S.C. 154(b) by 183 days.

(21) Appl. No.: 13/880,938

(22) PCT Filed: Oct. 18, 2011

(86) PCT No.: PCT/CA2011/001126
§ 371 (c)(1),
(2), (4) Date: Nov. 26, 2013

(87) PCT Pub. No.: WO2012/051700
PCT Pub. Date: Apr. 26, 2012

(65) Prior Publication Data
US 2014/0078514 A1 Mar. 20, 2014

Related U.S. Application Data

(60) Provisional application No. 61/405,912, filed on Oct. 22, 2010.

(51) Int. Cl.
| G01B 11/24 | (2006.01) |
| G01S 7/481 | (2006.01) |
| G01S 17/10 | (2006.01) |
| G01S 17/48 | (2006.01) |
| G01S 17/00 | (2006.01) |

(52) U.S. Cl.
CPC .............. *G01B 11/24* (2013.01); *G01S 7/4811* (2013.01); *G01S 7/4817* (2013.01); *G01S 17/10* (2013.01); *G01S 17/48* (2013.01); *G01S 17/003* (2013.01)

(58) Field of Classification Search
None
See application file for complete search history.

(56) References Cited

U.S. PATENT DOCUMENTS

| 4,627,734 A | 12/1986 | Rioux |
| 7,897,924 B2 * | 3/2011 | Xu .......................... G01B 11/24 250/341.1 |
| 2009/0195790 A1 | 8/2009 | Zhu et al. |
| 2012/0051700 A1 | 3/2012 | Terada et al. |

FOREIGN PATENT DOCUMENTS

| JP | 5187837 A | 7/1993 |
| WO | 2007025362 A1 | 3/2007 |
| WO | WO2007025363 A1 | 3/2007 |

OTHER PUBLICATIONS

International Search Report and Written Opinion issued in PCT/CA2011/001126, mailed Feb. 29, 2012, 7 pages.

* cited by examiner

*Primary Examiner* — Gregory J Toatley
*Assistant Examiner* — Amanda Merlino
(74) *Attorney, Agent, or Firm* — Harness, Dickey & Pierce, PLC

(57) ABSTRACT

A sensor for determining a profile of an object surface relative to a reference plane includes a radiation source, a collector, a processor, first and second reflectors and at least one reflective element comprising third and fourth reflectors secured in mutual angular relation. The radiation source projects a launch beam for impingement onto the object surface. The collector detects at least a portion of a return beam reflected by the object surface. The processor determines the profile of the object surface at a point of impingement of the launch beam onto the object surface from at least one characteristic of the at least a portion of the return beam.

20 Claims, 15 Drawing Sheets

WIDE ANGLE BISTATIC SCANNING OPTICAL RANGING SENSOR

RELATED APPLICATIONS

The present application is a national phase application, filed pursuant to 35 U.S.C. §371, of PCT Application No. PCT/CA2011/001126 filed on Oct. 18, 2011, which claims priority from U.S. Provisional Patent Application No. 61/405,912, filed Oct. 22, 2010 by Neptec Design Group Ltd., naming Xiaag Zhu as inventor and entitled "Wide Angle Bistatic Scanning Optical Ranging Sensor", which is incorporation by reference in its entirety herein.

TECHNICAL FIELD

The present disclosure relates to optical ranging sensors and more particularly, to a bistatic scanning optical ranging sensor.

INTRODUCTION

Optical ranging sensors for determining the profile of the surface of an object relative to a reference plane are known. In some aspects, such sensors are often used to determine the range from the sensor to the object. Typically, they involve the transmission of an optical launch beam for reflection by the object and measurement of a scattered return beam from which the range to the object may be calculated. One such system is Light Detection And Ranging (LIDAR) which measures the time of flight (TOF) of a collimated optical launch beam (typically using laser pulses) and its scattered return beam.

Monostatic LIDAR sensors, in which the launch beam and return beam are co-aligned, are relatively simple in structure and assist in gaining a conceptual understanding of ranging using LIDAR. A simple example non-scanning monostatic LIDAR sensors is schematically shown in FIG. 1, in which the sensor 1 includes a laser source 2, which is typically a pulsed laser, a first lens 3, a beam splitter 4, a second lens 6, a detector 7 and a TOF unit 11. A pulsed launch laser beam 8 emanating from the laser source 2 passes through the first lens 3 and beam splitter 4, projecting the launch beam 8 onto an object 10, whose range is to be measured. The beam splitter 4 receives laser light reflected back from the object 10 and is arranged so that the component of the return beam 9 between the object 10 and the beam splitter 4 is co-aligned with the launch beam 8 so that the return beam 9 impinges upon the detector 7. The beam splitter 4 reflects the return beam 9 at 90° onto the detector 7 via the second lens 6. The range is measured by a TOF unit 11 using a TOF technique based on the time interval between the pulsed launch beam 8 and detected return beam 9 and knowledge of the speed of light.

In the optical path schematic drawings (which are not necessarily to scale) in this disclosure, the beams 8, 9 shown represent the chief rays of beams of a given size. In the case of the launch beam 8, the chief ray is the central ray of a collimated beam. For return beams 9, the chief ray is the central ray for an imaging spot formed by the collection lens 6. Those having ordinary skill in this art will appreciate that beams 8 incident on an object 10 may be scattered in all directions and only a fraction of such scattered light, shown as return beam 9, may be collected by the lens 6. Whether or not the return beam 9 will impinge upon the detector 7 will be decided by the angle formed by the return beam 9 to the lens 6, as opposed to its location.

In some example embodiments, the beam splitter 4 could be replaced by a parabolic mirror (not shown) facing the object 10, with a central aperture to allow the launch beam 8 to pass through it.

In some example embodiments, three-dimensional sensing may be obtained by mounting the system on a pan-tilt unit that is re-oriented from time to time so that the launch beam 8 is reflected off different locations on the surface of the object 10 or by interposing an optical scanner (not shown) between the beam splitter 4 and the object 10 to control the beam direction so as to direct the launch beam 8 along a two-dimensional grid (usually designated as comprising x- and y-coordinate values) substantially normal to the launch beam axis and defining the reference plane, and measuring as the range, the z-coordinate lying on an axis normal to the reference plane, for each (x,y) coordinate pair. In such an arrangement, the optical scanner also receives laser light reflected back from the object 10 and is arranged to maintain the co-aligned arrangement between the component of the return beam 9 and the launch beam 8 between the object 10 and the optical scanner, so as to ensure that the detector 7 images the return beam 9 regardless of scanning angle (a concept known as auto-synchronization).

The maximum angular direction at which the launch beam 8 may be directed by the optical scanner while remaining auto-synchronized defines the field of view (FOV) of the sensor. Generally, it is considered beneficial to have as large a FOV as possible.

Monostatic optics are often used in scanning LIDARs because of their relatively small mirror size. In many applications for optical ranging sensors, the sensor is mounted on a moving platform, which may be ground-, air- or even space-based. As such, it is beneficial to have as small a sensor package as possible.

However, because monostatic LIDAR sensors have the return beam 9 co-aligned with the launch beam 8, there is a risk that scattering of the launch beam 8 may be detected at the detector 7, which may lead to anomalous range calculations, since any scattering lies in the path of the receiving optics. For this reason, monostatic LIDAR sensors typically do not detect the return beam 9 from objects 10 that are within a few meters range. Furthermore, because the power of the return beam 9 attenuates significantly as range increases, unless the detector 7 has an extremely high dynamic range, it also may not detect the return beam 9 if the object 10 is distant.

By way of non-limiting example, if a monostatic LIDAR sensor is designed to have a range from 0.5 m to 3 km, the dynamic range of an avalanche photodiode (APD) detector 7 may approach $$75.5 \text{ dB}\left(= 10 \log\left(\left(\frac{3000}{0.5}\right)^2\right)\right)$$

according to the LIDAR return signal equation for returned pulses by an object 10, as set out in Equation (1) below:

$$P_1(R) \propto P_0 \times \varepsilon \times \exp\left[-2\int_0^R \alpha(R')\,dR'\right] \times \frac{A}{R^2} \quad (1)$$

where

R is the range to the target,

P(R) is the LIDAR returned power from scattering at range R, $P_o$ is the LIDAR launch pulse power, $\alpha(R)$ is the absorption coefficient of the aerosol at range R, A is the target reflectance, and $\epsilon$ is the target reflectance.

The dynamic range could be even higher if one takes into account the return beam variation due to target reflectance. Thus, the total dynamic range could exceed 90 dB.

Therefore, although more complicated in design and consequently generally larger, bistatic LIDARs, which separate the launch beam 8 and the return beam 9 in space by employing different lenses side by side, are generally employed for ranging purposes. A simple non-scanning bistatic LIDAR sensor is schematically shown in FIG. 2, in which the sensor, shown generally at 21, comprises a laser source 2, projection lens 3, collection lens 6, detector 7 and a TOF unit 11. The laser source 2 and the detector 7 are spaced apart by a fixed distance in a bistatic arrangement. Launch beam 8 is projected onto object 10 by projection lens 3 and the reflected return beam 9 is imaged by collection lens 6 onto detector 7. Again, the range is measured using a TOF technique based on the time interval between the pulsed launch beam 8 and detected return beam 9 and knowledge of the speed of light.

In bistatic optical sensors, distant objects 10 are more likely to return beams 9a that impinge normally on collection lens 6, while close objects will tend to return beams 9b that impinge at a large angle to the axis of the collection lens 6. This characteristic is known as the triangulation effect, because trigonometry may be employed to generate a range calculation from measurement of the angle of incidence of the return beam (typically by employing a large detector 7 and measuring the lateral deflection along direction D of the return beam 9 at the detector 7), which increases as the distance R to the object 10 is reduced. Indeed, triangulation sensors typically employ similar optics to bistatic LIDAR sensors, albeit with different laser sources 2 (typically continuous wave (CW)) and detectors 7 as discussed above, and dispensing with the TOF unit 11.

U.S. Pat. No. 4,627,734 entitled "Three Dimensional Imaging Method and Device" filed Jan. 16, 1986 by Rioux and issued Dec. 9, 1986, which is incorporated by reference in its entirety herein, describes, in conjunction with a triangulation system, a system of mirrors by which a laser beam is projected onto an area of a surface, the profile of which is to be examined, and a beam reflected from such area is received by a detector. The system provides synchronized scanning of the projected and detected beams in such a way that the beams are scanned in a direction X lying in the beam plane, i.e. the plane defined by the beams, and by further simultaneous and synchronous scanning that takes place in a direction Y also lying in the beam plane and normal to the X direction. The detected position in the detector remains unchanged when the surface under examination is a flat reference plane parallel to the beam plane, changing only as a measure of the degree of deviation of each examined area from such reference plane in the direction Z, where the directions X, Y and Z are all mutually perpendicular. The speed of operation enables the system to determine the three-dimensional shape of moving articles. However, the system is not dependent upon movement of the article to achieve full scanning.

In the Rioux system, the location of the return beam spot on the detecting plane depends on the range to the target. Applied to the context of a TOF ranging system, dynamic range constraints may be managed. Under a TOF system, ranging will occur even if only a fraction of the return beam, sufficient to trigger the detector, impinges the detector. Thus, the triangulation effect may be employed to keep the size of the detector relatively small. That is, if the returned beam is from a nearby object, it will not impinge the detector directly. However, certain optical devices such as, by way of non-limiting example, cylindrical lenses, diffusers, diffractive optical elements or multiple fiber receivers may be used to direct a part of the return beam onto the detector in a controlled fashion to increase the range coverage.

FIG. 3 shows a LIDAR sensor adapted from the optics of the triangulation system described by Rioux. The sensor, shown generally at 31, comprises a laser 2, an X-mirror 32, first and second side mirrors 33, 35, a Y-mirror 34, a collection lens 6, a cylindrical lens 36, a collector 37 and TOF unit 11. The laser 2, collection lens 6 and TOF unit 11 are similar to the corresponding components in the example embodiments of FIGS. 1 and 2.

The interposition of the laser 2 between the Y-mirror 34 and the object 10, however, introduces complexities in the sensor 31, including without limitation, optical limitations because of the aperture in the face of the Y-mirror 34, which may affect certain measurements, and the overall size of the sensor 31.

A bistatic scanning optical apparatus that maintains an auto-synchronized relationship between the launch beam and the return beam during high-speed scanning in the (x, y) coordinate space is disclosed in commonly-assigned PCT International Application Publication No. WO/2007/025363 entitled "Apparatus and Method for Tracking an Object", filed by Zhu et al. ("Zhu No. 1") on Mar. 8, 2007, which is incorporated by reference in its entirety herein. Auto-synchronization is maintained by moving two internal mirrors rather than the entire optical head. A number of arrangements are disclosed to permit the receiving detector to receive light from the return beam from objects at a variety of ranges in a controlled fashion, including a diffuser, discrete optical elements or multiple fiber receivers.

Thus, FIG. 3 illustrates the result of adapting the principles of Zhu No. 1_to the sensor 31 of FIG. 3, by interposing fixed folding mirror elements 38 between the laser 2 and the X-mirror 32. The use of one of the folding mirror elements 38, in isolation permits the laser 2 to be moved out of the path between the object and the X-mirror 32 and oriented such that the launch beam 8 is projected transverse to the Z-axis (in some example embodiments, along the X-axis). The use of both folding mirrors 38 permits the laser 2 to be oriented such that the launch beam 8 is projected along the Z-axis and toward the object 10. Additionally, the physical footprint of sensor 31 may be slightly reduced with the laser 2 in such orientation. In some example embodiments, one or both of the folding mirrors 38 may be replaced by a prism, such as is shown in FIG. 3, in relation to element 39.

The laser 2 is positioned to project the launch beam 8 along the Z-axis but away from the object 10 and onto the X-mirror 32. In some example embodiments (not shown), the laser 2 is disposed between the Y-mirror 34 and the object 10 and the launch beam 8 passes through an aperture in the Y-mirror 34 before impinging onto a first face of the X-mirror 32.

The X-mirror 32 has a pair of opposed planar reflective faces that are rotatable together (under the direction of a rotating means such as a galvanometer (not shown)) about an axis that generally extends along the Y-axis and permits deflection of the launch beam 8 onto the first side mirror 33 to permit scanning of the object 10 along the X-coordinate axis. The first side mirror 33 is fixed in position but has a length suitable to cover the possible range of deflections within the FOV of the sensor 31, and reflect the launch beam 8 back onto the Y-mirror 34. The Y-mirror 34 is rotatable (under the direction of a rotating means such as a galvanometer (not shown)) about an axis that generally extends along the X-axis and permits deflection of the launch beam 8 in the Y-direction to permit scanning of the object 10 along the Y-coordinate axis.

Upon being reflected from the surface of the object 10, the return beam 9 is projected onto the same face (albeit typically laterally deflected along the X-axis) of the Y-mirror 34 and onto the second side mirror 35. The second side mirror 35 is fixed in position but has a length suitable to cover the possible range of deflections within the FOV of the sensor 31, and reflect the return beam 9 onto the second face of the X-mirror 32. This permits reflection of the return beam 9 onto the collection lens 6 along substantially the same path taken by the launch beam 8 as it approached the first face of the X-mirror 32.

The collector 37 is positioned at a location corresponding to the point of impingement of a return beam 9 passing through collection lens 6 upon reflection from an object 10 at an infinite distance. This ensures that the sensor 31 has a maximum receiving efficiency for receiving the return beam 9a from objects at far-off distances (by way of non-limiting example, in excess of 10 m), shown as 10a. While this arrangement has the consequential effect that the receiving efficiency will be reduced for close objects, shown as 10b (since the scattered light corresponding to the return beam 9b from these objects may not necessarily directly impinge upon the collector 37 after passing through the collection lens 6), the collection lens 6 is supplemented by cylindrical lens 36, which is positioned to refract a portion of the light arriving at a large angle (indicative of a nearby object) 10b that would be likely to otherwise miss the collector 37, onto collector 37 so as to perform TOF ranging at the TOF unit 11. This permits such bistatic optics to be employed with nearby objects with a collector 37 of reasonable size and dynamic range or even to reduce the size of the collector 37 as shown.

The use of internal swapping mirrors, that is, the X-mirror 32 and the Y-mirror 34, facilitates high speed scanning by dispensing with external beam pointing mechanisms such as mounting the static optical assembly on a pan-tilt unit. Furthermore, the configuration employed ensures that a return beam spot on an array falls approximately at the same location for objects 10 at the same range irrespective of the scanning angle of the X-mirror 32 or Y-mirror 34.

However, even with the use of folding mirror elements 38, the FOV of the sensor 31 remains constrained by the size of the two side mirrors 33, 35. If a beam is deflected too far to impinge on a side mirror 33, 35, no ranging may be determined. The limitations imposed on the FOV by the dimension and position of the side mirrors 33, 35 is known as "vignetting" and imposes constraints on the ability to construct a LIDAR ranging sensor with a large in-plane FOV and a low profile. In some example embodiments of a FOV of substantially 30° and a profile having an optical base plate of substantially 11.8"×11.8" may be achieved with such a sensor 31. In some example embodiments, the collection lens 6 used in the sensor 31 may have a diameter of substantially 25 mm and a focal length of substantially 75 mm, resulting in a maximum receiving aperture of substantially 22 mm×22 mm.

Increases in the FOV or decreases in the profile of bistatic scanning LIDARs or both are desirable.

BRIEF DESCRIPTION OF THE DRAWINGS

Example embodiments of the present disclosure will now be described by reference to the following figures, in which identical reference numerals in different figures indicate identical elements and in which.

DESCRIPTION

The present disclosure will now be described in detail for the purposes of illustration only, in conjunction with certain embodiments shown in the enclosed drawings.

Figure 4:
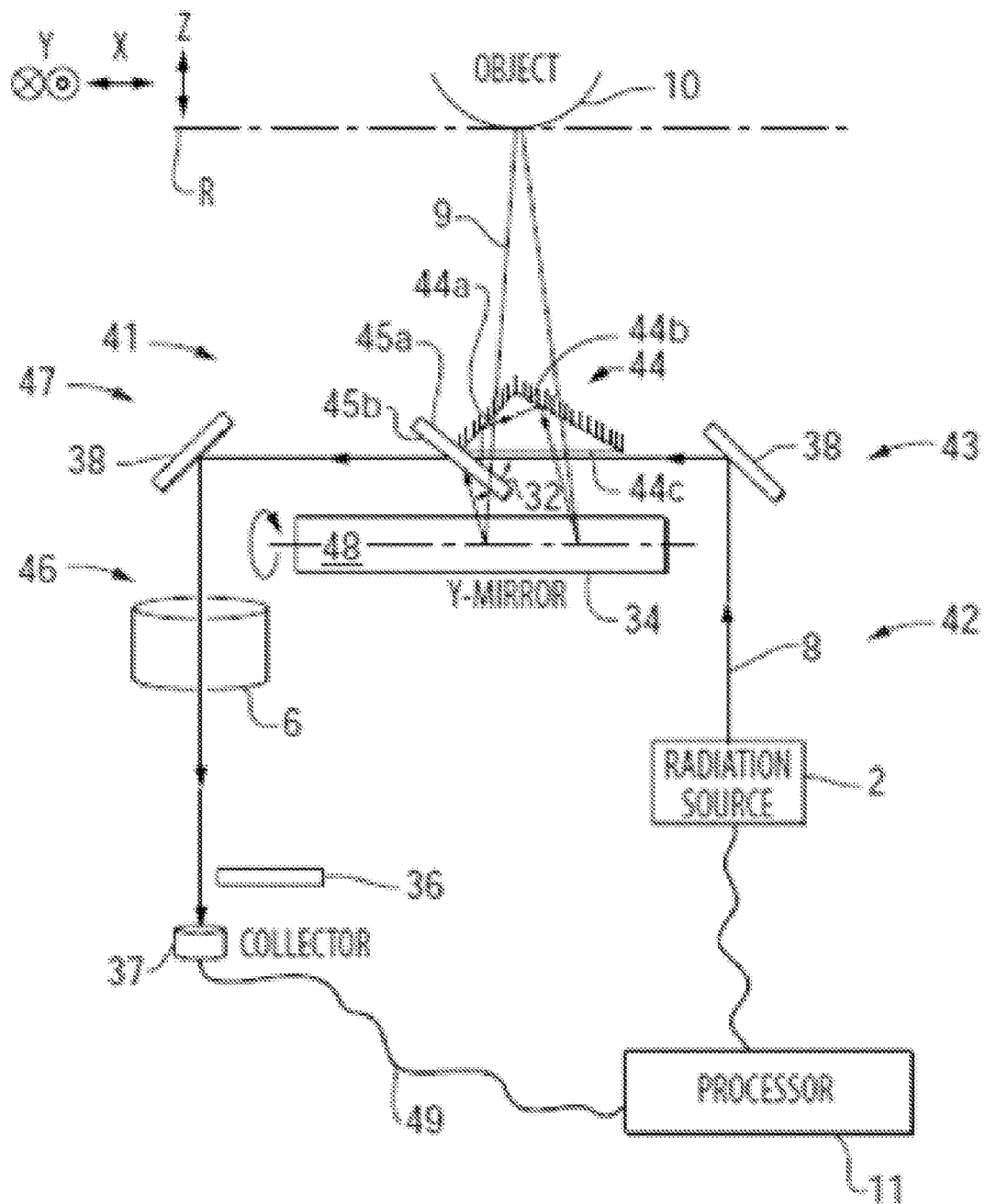
FIG. 4 is a schematic diagram of a three-dimensional low profile wide angle bistatic LIDAR optical ranging sensor according to an example embodiment of the present disclosure.

FIG. 4 is a schematic diagram of a three-dimensional low profile wide angle bistatic LIDAR optical ranging sensor according to an example embodiment of the present disclosure. The sensor, shown generally at 41, comprises a beam generating section shown generally at 42 for generating a launch beam 8, a beam steering section shown generally at 43 for directing the launch beam 8 toward an object 10, a beam receiving section shown generally at 46 for directing a return beam 9 scattered from impingement of the launch beam 8 on the surface of the object 10, a collector 37 for detecting at least a portion of the return beam 9 and a processor 11 for determining the profile of the surface of the object 10 relative to a reference plane R. In some example embodiments, the sensor 41 may comprise one or more folding mirrors 38.

The beam generation section 42 comprises a radiation source 2 and in some example embodiments, comprises a beam modifier (not shown), a beam conditioner (not shown), or both.

The radiation source 2 is in data communication with the processor 11. It generates a launch beam 8 of electromagnetic radiation for impingement through the beam steering section 43 onto the surface of the object 10 and provides a measurement of a characteristic of the launch beam 8 to the processor 11.

The radiation source 2 may, in some example embodiments be a source of coherent electromagnetic radiation, such as, by way of non-limiting example, a pulsed laser such as a InGaAs-based pulsed near-infrared laser having a wavelength, in some example embodiments of substantially 950 nm. Using a semiconductor pulsed laser permits a small size, low power consumption and high reliability. InGaAs is also considered to be a radiation hardy material for space applications. In some example embodiments, the radiation source 2 has an output peak power of 65 W.

In some example embodiments, the radiation source 2 may comprise a CW laser and a beam modifier (not shown) may be employed to pulse the beam, by way of non-limiting example, by a voltage-controlled optical filter.

In some example embodiments, a CW laser may be used for the radiation source 2 and the range, that is, the distance between the sensor 41 and the object 10 may be determined by measuring the phase difference between the launch beam 8 and the return beam 9.

In some example embodiments, the radiation source 2 may comprise any suitable energy source for producing a launch beam 8 that can be reflected by the object 10 including non-coherent electromagnetic radiation. By way of non-limiting example, the radiation source 2 may comprise at least one source of non-coherent radiation, such as an Erbium-doped fiber amplifier (EDFA). In some example embodiments, the radiation source may be adapted to restrict the range of wavelengths of radiation in the launch beam 8, by way of non-limiting example, by providing a monochromatic light source or a filter.

In some example embodiments, the measurement is a time of launch of a given point of the launch beam 8 (by way of non-limiting example, a given pulse of the launch beam 8). In some example embodiments, the measurement is a phase at launch of a given point of the launch beam 8 (by way of non-limiting example, a given pulse of the launch beam 8).

In some example embodiments, the launch beam 8 may be launched using a waveguide (not shown) such as an optical fiber, which outputs a divergent beam.

In some example embodiments, the launch beam 8 may be conditioned by the beam conditioner (not shown). In some example embodiments, the beam conditioner (not shown) may comprise a collimator (not shown) for collimating the launch beam 8. In some example embodiments, the collimator (not shown) may be positioned at the output of the radiation source 2 or in any other suitable location. In some example embodiments, the beam conditioner (not shown) may comprise a beam expander (not shown) for expanding the launch beam 8 to a diameter which reduces beam divergence and allows the launch beam 8 to remain collimated over a longer distance to extend the range over which objects 10 can be detected and their distance measured. In some example embodiments, the launch beam 8 output by the beam expander (not shown) is of sufficient size for industrial or lab safety purposes or both, such as, by way of non-limiting example, in excess of 10 mm. In some example embodiments, the beam expander (not shown) may comprise a fixed beam expander. In some example embodiments, the beam expander (not shown) may comprise a controllable expander to allow the beam width to be varied.

In some example embodiments, the beam conditioner (not shown) may comprise a focusing device (not shown) such as a lens (not shown) for controlling the size of the launch beam 8 as a function of distance. In some example embodiments, the focusing device (not shown) may be integral with the beam expander (not shown).

In some example embodiments, the lens (not shown) may be positioned in front of the end of the waveguide (not shown). In some example embodiments, the launch angle or angle of divergence of the launch beam 8 from the output of the waveguide (not shown) may be predetermined and fixed or controllable. In some example embodiments, the width of the launch beam 8 at the lens (not shown) may be independently controllable by means of an aperture (not shown). In some example embodiments, the size of the launch beam 8 may be controlled by changing the distance between the lens (not shown) and the output of the waveguide (not shown). In some example embodiments, the focal length of the launch beam 8 projected beyond the lens (not shown) may be controlled, by way of non-limiting example, by changing the distance between the lens (not shown) and the waveguide (not shown).

In some example embodiments, the beam conditioner (not shown) comprises a second collimator for collimating the expanded launch beam 8.

In some example embodiments, the spot size of the launch beam 8 at exit may be 25 mm, with a beam divergence of 7 mrad.

In some example embodiments, the beam conditioner (not shown) comprises a power controller (not shown), by way of non-limiting example, an amplifier or attenuator or both for controlling the output power in the launch beam 8.

Figure 1:
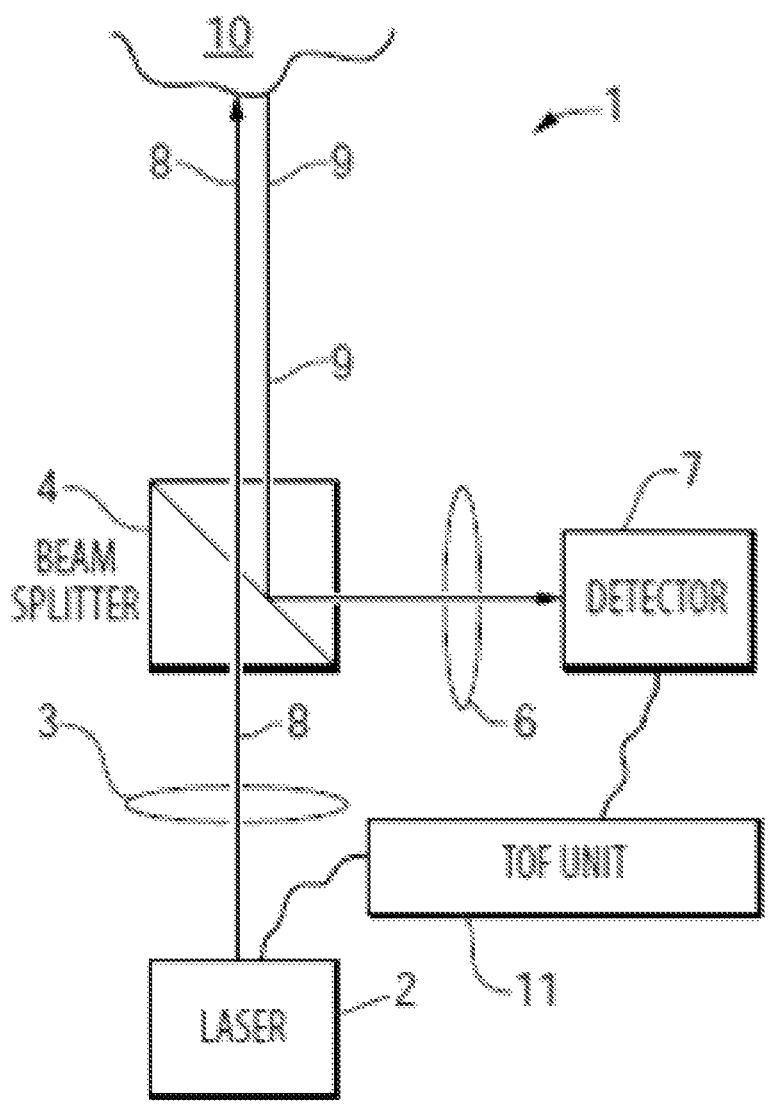
FIG. 1 is a schematic diagram of a non-scanning monostatic LIDAR optical ranging sensor.
Figure 2:
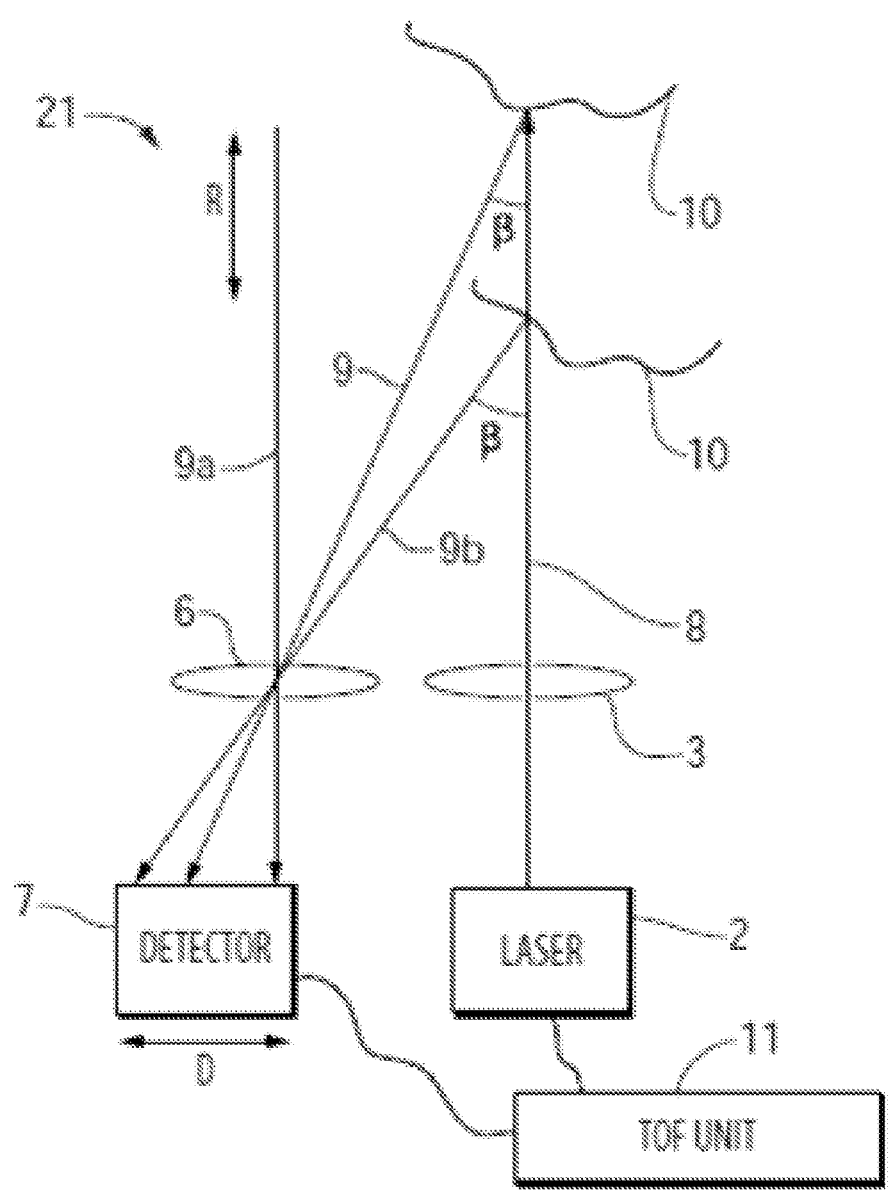
FIG. 2 is a schematic diagram of a non-scanning bistatic LIDAR optical ranging sensor.
Figure 3:
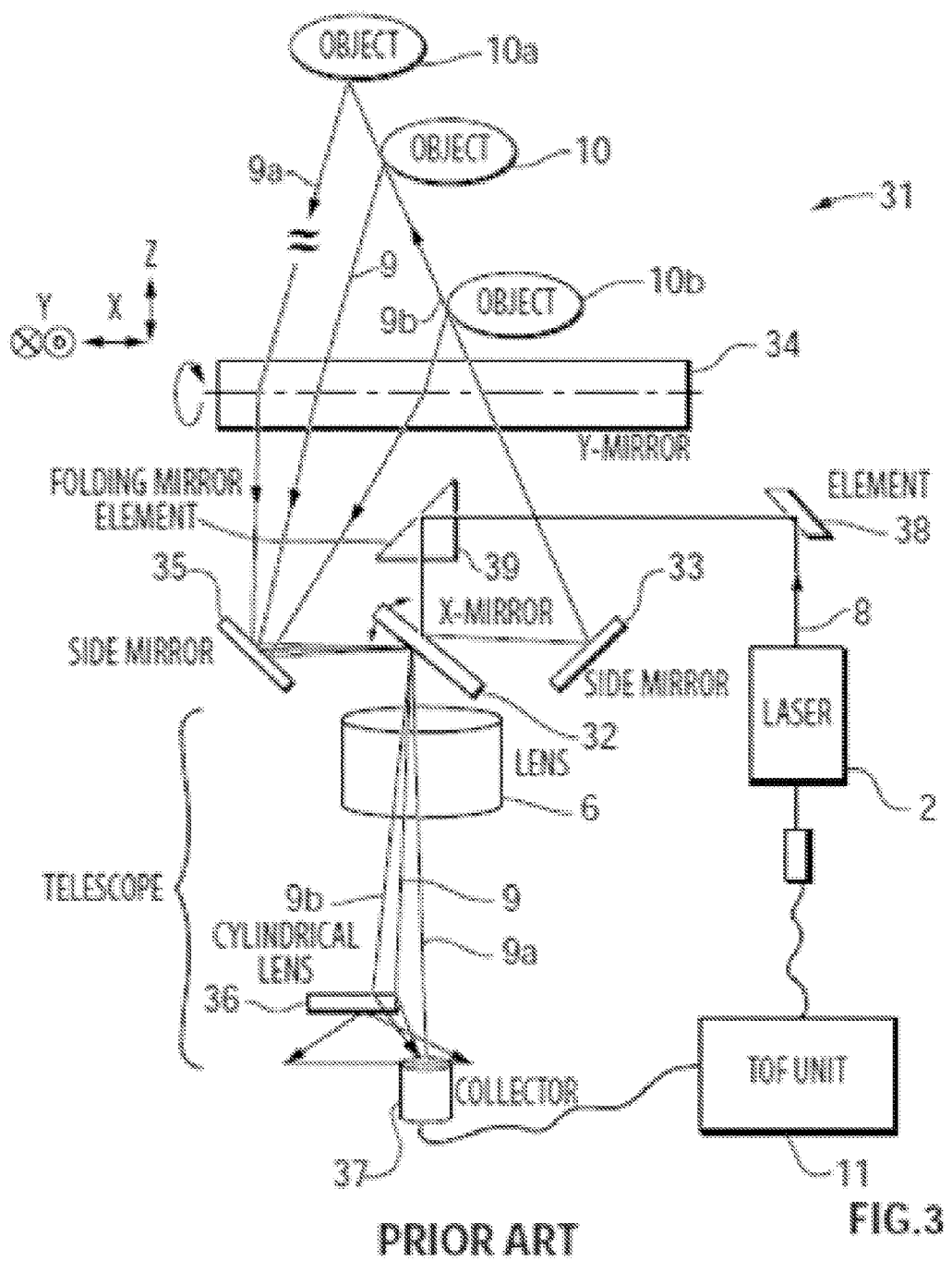
FIG. 3 is a schematic diagram of a three-dimensional bistatic LIDAR optical ranging sensor with internal swapping mirrors.

The beam steering section 43 directs the launch beam 8 onto the surface of the object 10. It comprises a number of reflective or refractive or both optical elements. In one example embodiment, the beam steering section 43 comprises a first reflector such as X-mirror 32, a second reflector such as Y-mirror 34, and at least one reflective element such as prism 44. In the example embodiment shown in FIG. 4, the at least one reflective element 44 is arranged entirely on the launch side of the sensor 41 and proximate to the X-mirror 32, and dispenses with the side mirrors 33, 35 (FIG. 3) (one on each of the launch and return sides of the sensor 31). Such configuration provides a number of performance advantages including without limitation, auto-synchronizing of the launch beam 8 and the return beam 9, increased FOV, larger receiving aperture and increased operative range.

The X-mirror 32 is a movable mirror rotatable about a first axis (the Y-axis) normal to the reference plane R, for controlling impingement of the launch beam 8 along a second axis (the X-axis) substantially normal to the reference plane R and normal to the first axis. In some example embodiments, the operating angular range of the X-mirror 32 may be substantially between 34° and 60°. The X-mirror 32 has a first reflecting surface 45a and a second reflecting surface 45b, which are opposed and parallel to one another and substantially planar. In some example embodiments, the size of the first and second reflecting surfaces 45a, 45b may be substantially 35 mm×50 mm. Taking into account the operating angular range of the X-mirror 32, the effective maximum receiving aperture of the X-mirror 32 may be substantially 35 mm×31.5 mm and the effective minimum receiving aperture of the X-mirror 32 may be substantially 35 mm×25 mm. The first reflecting surface 45a reflects the launch beam 8 along a first path toward the object 10 and the second reflecting surface 45b reflects the return beam 9 along a second path parallel and opposed in direction to the first path.

The Y-mirror 34 is a movable mirror rotatable about the second axis (the X-axis), for controlling impingement of the launch beam 8 along the first axis (the Y-axis). In some example embodiments, the operating angular range of the Y-mirror 34 may be substantially between 25° and 55°. The Y-mirror 34 has a planar reflecting surface 48 for reflecting the launch beam 8 onto the surface of the object 10. In some example embodiments, the size of the reflecting surface 48 of the Y-mirror 34 may be substantially 50 mm×157 mm. Taking into account the operating angular range of the Y-mirror 34, the effective maximum receiving aperture of the Y-mirror 34 may be substantially 45.3 mm×157 mm and the effective minimum receiving aperture of the Y-mirror 32 may be substantially 28.7 mm×157 mm. The return beam 9 created by scattering upon impingement of the launch beam 8 onto the surface of the object 10 is also reflected off the reflecting surface 48 of the Y-mirror 34, albeit typically at a different point along the reflecting surface 48.

The X-mirror 32 allows the launch beam 8 to be steered laterally along the X-direction and the Y-mirror 34 allows the launch beam 8 to be independently steered laterally along the Y-direction so that together, the X-mirror 32 and the Y-mirror 34 allow the launch beam 8 to be steered in two dimensions that define the reference plane R, with a combined maximum effective aperture of substantially 45.3 mm×41.5 mm and a combined minimum effective aperture of substantially 28.7 mm×25 mm and a FOV of substantially 55°×60°.

Rotation of the X-mirror 32 and the Y-mirror 34 may be driven by any suitable mechanism that permits the angle of the X-mirror 32 or Y-mirror 34 to be moved quickly to any desired angle or, for example, in an oscillating pattern. In some example embodiments, an electric motor or galvanometer (not shown) may be configured to drive the X-mirror 32 or the Y-mirror 34 or both. In some example embodiments, the positioning of the X-mirror 32 or the Y-mirror 34 or both may be controlled by a scanning controller (not shown) which may include a user interface (not shown) for receiving user input commands for controlling the direction of the launch beam 8. In some example embodiments, the X-mirror 32 and the Y-mirror 34 may each be driven by a separate motor or galvanometer (not shown) under central control (not shown) to synchronize the movement of both mirrors 32, 34.

In some example embodiments, the first and second reflecting surfaces 45a, 45b of the X-mirror 32 or the reflecting surface 48 of the Y-mirror 34 or any of them, are mirrors comprising plates of transparent material having planar front and rear surfaces with the rear surface made reflective, by way of non-limiting example, by providing a reflective coating thereon. In some example embodiments, the reflective coating comprises aluminum, although any other suitable reflective material may be used.

The at least one reflective element 44 comprises a third reflector 44a and a fourth reflector 44b secured in mutual angular relation, and is disposed so as to be impinged upon by the launch beam 8 between reflection off the first reflecting surface 45a of the X-mirror 32 and the reflecting surface 48 of the Y-mirror 34. In particular, the third reflector 44a has a planar reflecting surface substantially parallel to the Y-axis, for receiving the launch beam 8 after it is reflected off the first reflecting surface 45a of the X-mirror 32 and reflects it onto the fourth reflector 44b and the fourth reflector 44b has a planar reflecting surface substantially parallel to the Y-axis, for receiving the launch beam 8 after it is reflected off the third reflector 44a and reflects it onto the reflecting surface 48 of the Y-mirror 34 for impingement onto the surface of the object 10.

In some example embodiments, the third and fourth reflectors 44a, 44b are substantially normal to each other. In some example embodiments a first end of the third reflector 44a is positioned proximate to the axis of rotation of the X-mirror 32. In some example embodiments, the third reflector 44a extends toward the object 10, that is to say, a second end of the third reflector 44a is positioned between the first end of the third reflector 44a and the reference plane R. In some example embodiments, the first end of the third reflector 44a is positioned between the second end of the third reflector 44a and the axis of rotation of the X-mirror 32.

In some example embodiments, the third and fourth reflectors 44a, 44b are proximate to each other, that is to say, the second end of the third reflector 44a is proximate to a first end of the fourth reflector 44b.

In some example embodiments, the at least one reflective element 44 is a prism and the third and fourth reflectors 44a, 44b are faces of the prism. In some example embodiments, the third and fourth reflectors 44a, 44b or any of them comprise a coating of reflective material. In some example embodiments, the reflective material comprises aluminum, although any other suitable reflective material may be used.

In some example embodiments, the third and fourth reflectors 44a, 44b are mirrors comprising plates of transparent material having planar front and rear surfaces with the rear surface made reflective, by way of non-limiting example, by providing a reflective coating thereon. In some example embodiments, the reflective coating comprises aluminum, although any other suitable reflective material may be used.

In some example embodiments, the at least one reflective element comprises a refractive boundary 44c that is substantially parallel to the Y-axis and through which the launch beam 8 passes after reflection off the fourth reflector 44b and before reflection onto the surface of the object 10.

In some example embodiments, the refractive boundary 44c is defined by the first end of the third reflector 44a and the second end of the fourth reflector 44b. In some example embodiments, the refractive boundary 44c is substantially parallel to the axis of rotation of the Y-mirror 34. In some example embodiments, the refractive boundary 44c is substantially parallel to the reference plane R. In some example embodiments, the refractive boundary 44c is a face of the prism 44.

The refractive boundary 44c causes the launch beam 8, if incident on or exiting from the refractive boundary 44c at an angle to a normal axis of the refractive boundary 44c, to be refracted through the refractive boundary 44c at an increased angle. This permits an increased FOV, for a given physical footprint of the sensor 41. By way of non-limiting example, the FOV of the sensor 41 may, in some example embodiments, approach 60° (54°×60° in the X-direction and Y-direction respectively, as compared to 30° for the sensor 31 as described above. In some example embodiments, the in-plane may be restricted to 54° to permit a larger receiving aperture.

As such, the maximum receiving aperture of the sensor 41 may be substantially 45.3 mm×41.5 mm, that is, almost four times the size of that of the sensor 31. This capability is provided by the configuration of the beam steering section 43, including the interposition, between the X-mirror 32 and the Y-mirror 34, of the at least one reflective element 44 in a corner mirror configuration proximate to the axis of rotation of the X-mirror 32, especially when the at least one reflective element 44 is a prism.

Further, the use of a prism 44 provides a compact structure for the at least one reflective element 44, so that no structure lies behind either of the third or fourth reflectors 44a, 44b, which might otherwise interfere with the launch beam 8 and reduce the FOV. Moreover, the use of a prism 44 enables a relatively large launch beam 8 to be employed. The use of a larger launch beam 8 may concomitantly extend the operative range over which objects 10 may be detected (and their range measured).

Thus, the substantially fourfold increase in the maximum receiving aperture in combination with the larger launch beam 8 may provide a substantially twofold increase in operating range for given output power of the radiation source 2 and sensitivity of the collector 37.

These characteristics may be achieved by positioning a right-angled prism 44 between the X-mirror 32 and the reference plane R, such that its hypotenusal face, which constitutes the refractive boundary 44c, lies parallel to the axis of rotation of the Y-mirror 34 and the reference plane R, a first acute vertex of the prism 44 lies proximate to the axis of rotation of the X-mirror 32, and the third and fourth reflectors 44a, 44b (respectively corresponding to the side of the prism 44 extending from the first acute vertex to the right angle vertex and the side of the prism 44 extending from the right angle vertex to the other acute vertex) lie between the refractive boundary 44c and the reference plane R, as shown in FIG. 4.

The beam receiving section 46 comprises the reflecting surface 48 of the Y-mirror 34, the second reflecting surface 45b of the X-mirror 32, a collection lens 6 and a redirection element 36, such as a cylindrical lens, diffuser, diffractive optical element (DOE) or any combination of any of these.

It will be appreciated that if the surface of the object 10 is diffuse, the launch beam 8 will be scattered in a plurality of directions by the surface of the object 10 and only a portion of the scattered radiation will impinge upon the reflecting surface 48 of the Y-mirror 34. It is only such radiation that impinges upon the reflecting surface 48 of Y-mirror 34 that is referred to as the return beam 9.

In addition to directing the launch beam 8 to the surface of the object 10, the reflecting surface 48 of the Y-mirror 34 also receives the return beam 9 reflected by scattering from impingement of the launch beam 8 off the surface of the object 10 and reflects the return beam 9 onto the second reflecting surface 45b of the X-mirror 32.

Because the angle β between the launch and return beams 8, 9 varies inversely with the range to the object 10, the launch and return beams 8, 9 will not typically impinge on the reflecting surface 48 of the Y-mirror 34 at the same point, especially if the X-mirror 32 and Y-mirror 34 are progressively rotated over time to effect scanning of a region of the surface of the object 10.

As both the launch beam 8 and the reflected beam 9 are reflected by the planar reflecting surface 48 of the Y-mirror 34, the degree of scanning in the Y-direction is effectively taken into account or synchronized so as to be irrelevant for purposes of determining the range to the object 10.

Similarly, because the launch beam 8 and the reflected beam 9 are respectively reflected by the first and second reflecting surfaces 45a, 45b of the X-mirror 32, and the first and second reflecting surfaces 45a, 45b are planar, parallel to one another and opposed in direction (that is, arranged so that their reflective surfaces lie back to back), the degree of scanning in the X-direction is also effectively taken into account or synchronized so as to be irrelevant for purposes of determining the range to the object 10.

Thus, the X-mirror 32 and the Y-mirror 34 allow the launch beam 8 and return beam 9 to be steered and detected without moving either the radiation source 2 or the beam detection section 46 and while ensuring that any change in the lateral position of the launch beam 8 on the reference plane R orthogonal to the Z-direction (i.e. range to the object 10) will result in no change in the position of the return beam 8 at the collector 37. Accordingly, only changes in range will produce a change in the position or time of detection of the return beam 8 at the collector 37.

Figure 4A:
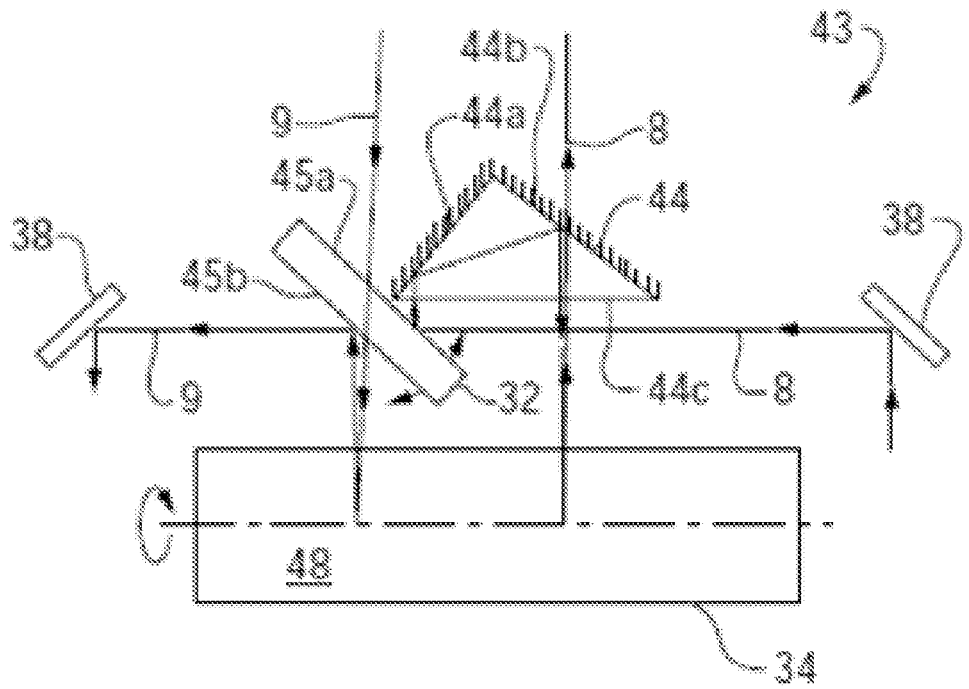
FIG. 4a is a schematic diagram of an expanded view of the beam steering section of FIG. 4 for an object positioned such that the launch beam and return beam are substantially parallel to the Z-axis.
Figure 4B:
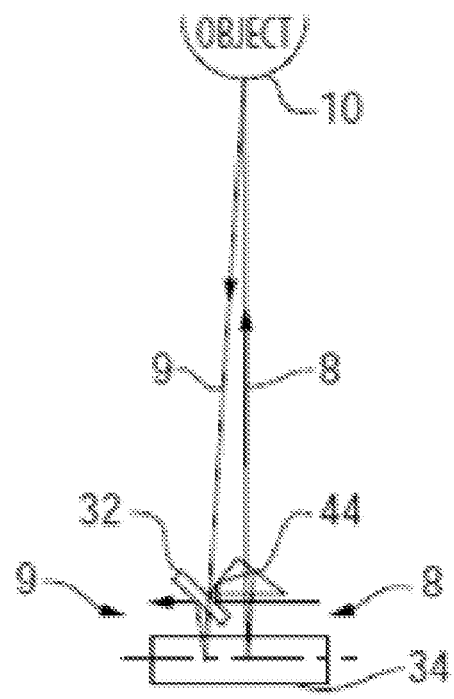
FIG. 4b is a contextual schematic diagram of the object and beam steering section of FIG. 4a, showing the launch beam and return beam passing between them.

FIG. 4a is a print out of an optical path simulation showing an expanded view of the beam steering section 43 of FIG. 4 for an object 10 positioned such that the launch beam 8 and return beam 9 are substantially parallel to the Z-axis. For purposes of illustration, the object 10 is shown slightly off-axis so as to show the launch beam 8 and the return beam 9 before and after reflection. FIG. 4b is a print out of an optical path simulation showing the context of FIG. 4a.

Figure 4C:
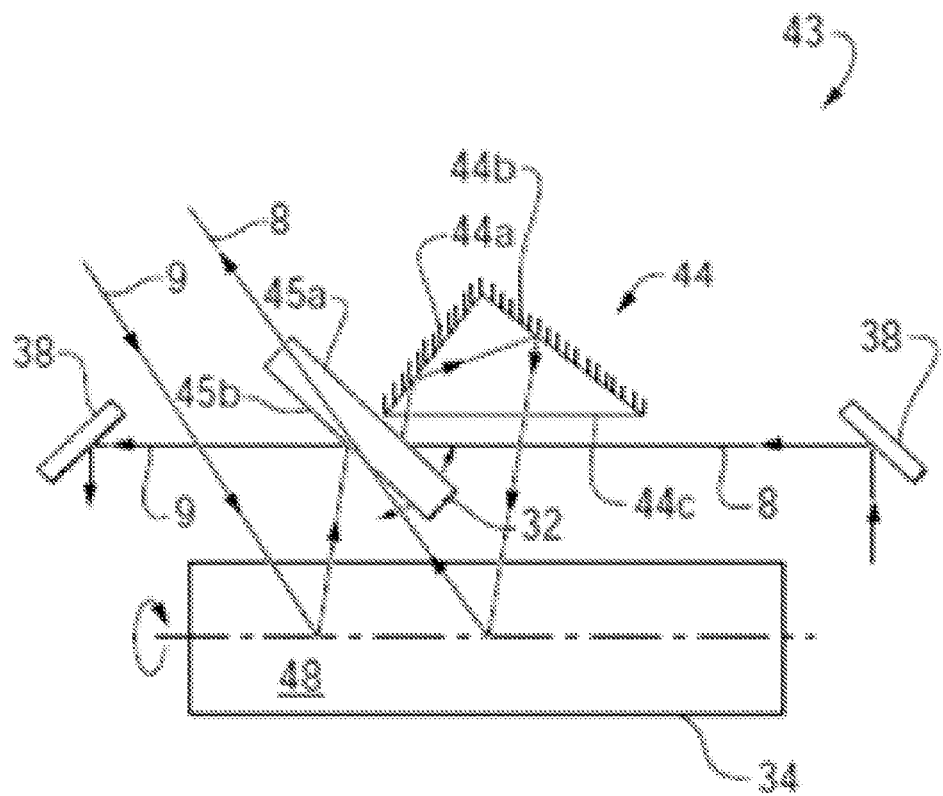
FIG. 4c is a schematic diagram of an expanded view of the beam steering section of FIG. 4 for an object positioned such that the launch beam and return beam are substantially at an angle to the Z-axis.
Figure 5:
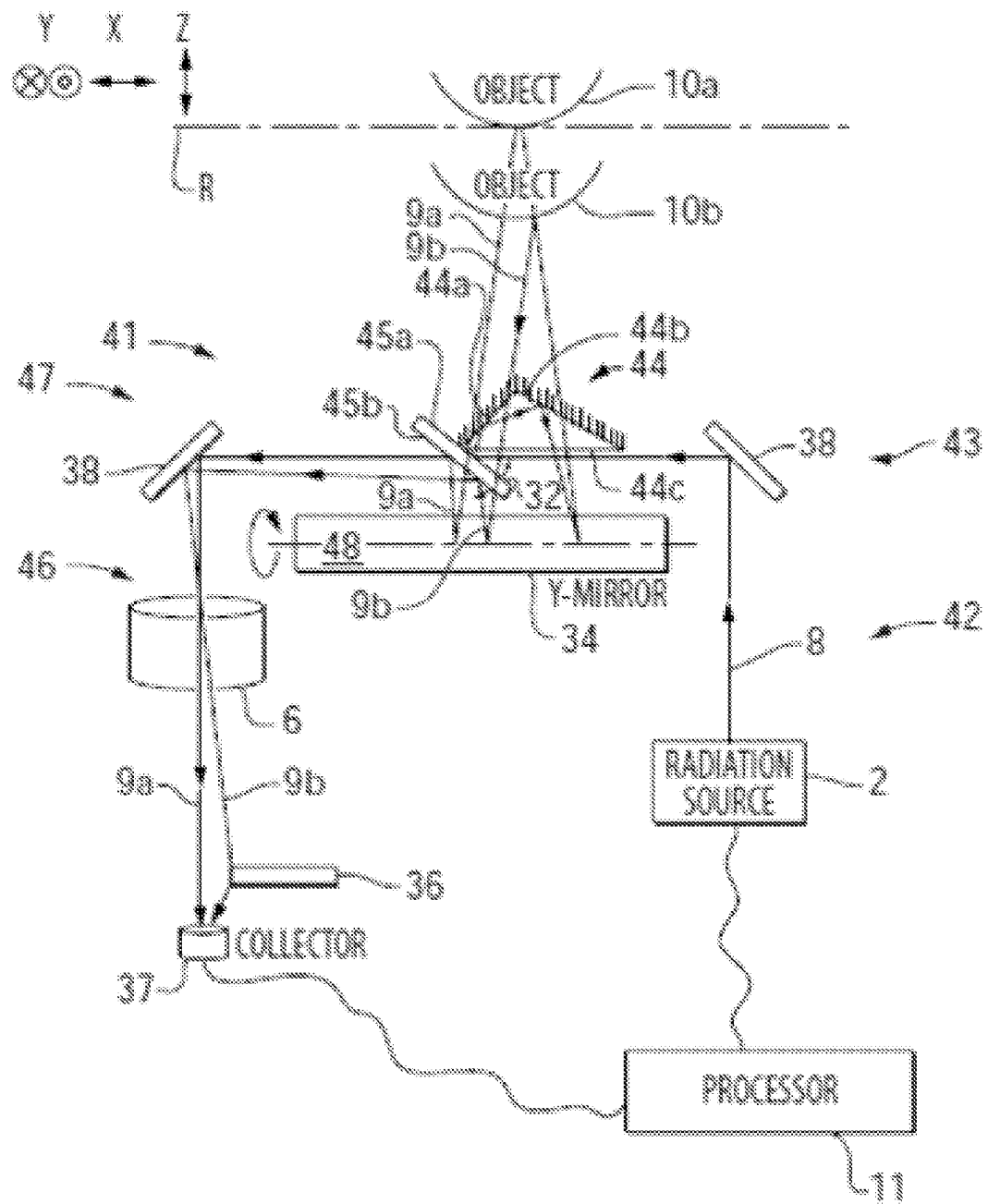
FIG. 5 is a schematic diagram of an expanded view of the optical ranging sensor of FIG. 4, showing a plurality of object positions at substantially different ranges and for a single scanning angle, and the paths of the return beam for each object position according to an example embodiment of the present disclosure.

FIG. 4c is a print out of an optical path simulation showing an expanded view of the beam steering section 43 of FIG. 4 for an object 10 positioned such that the launch beam 8 and return beam 9 are substantially at an angle to the Z-axis. The change of position of the X-mirror 32 is observable. Even so, the path of the return beam 9 remains substantially unchanged.

The collection lens 6 comprises at least one spherical lens for focusing the return beam 9 toward the collector 37. In some example embodiments, an arrangement of a plurality of lenses 6 may be employed as a telescope (not shown). In some example embodiments, the collection lens 6 may have substantially a 50 mm diameter, with a focal length of substantially 75 mm.

Figure 6:
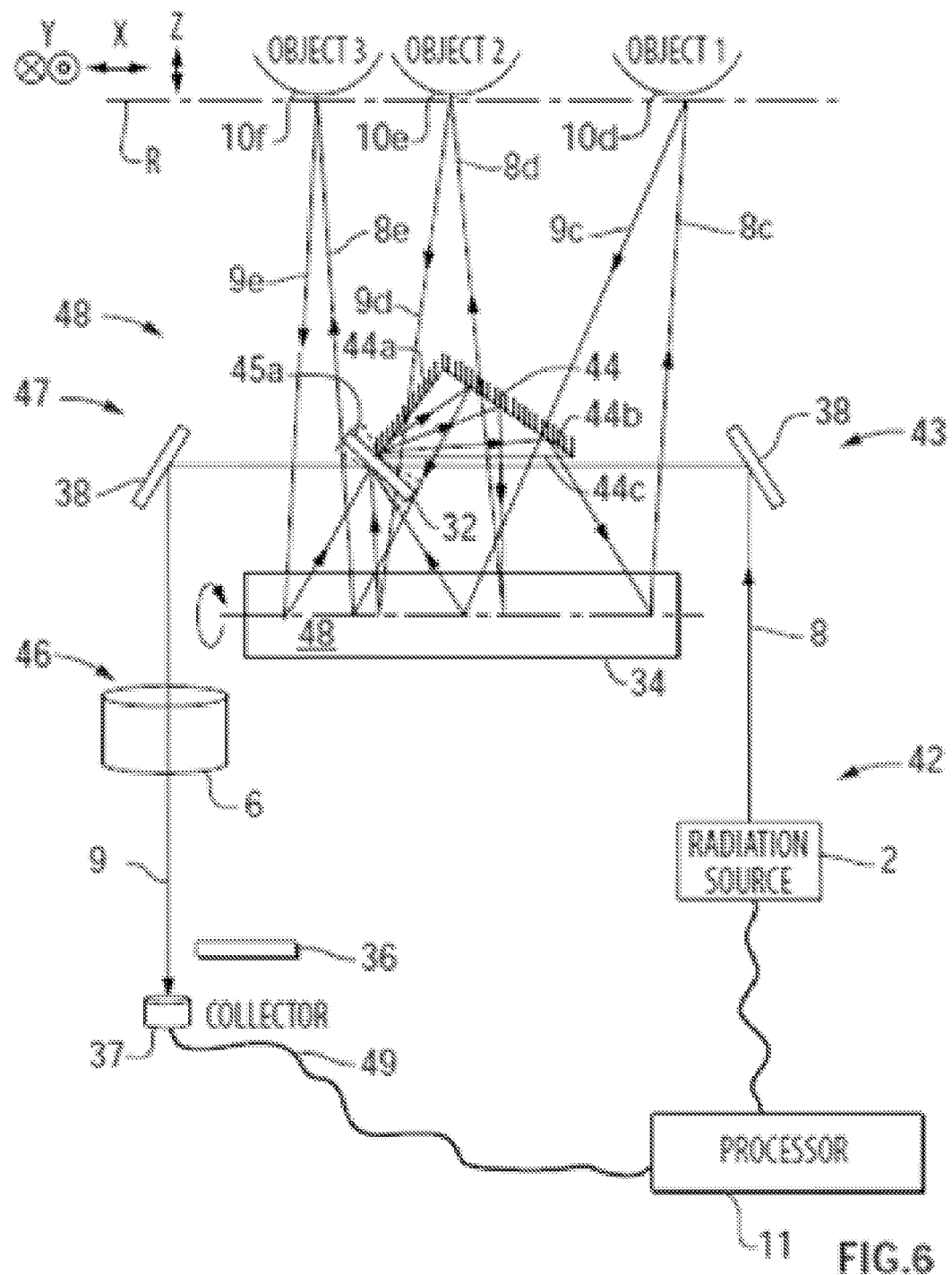
FIG. 6 is a schematic diagram of the optical ranging sensor of FIG. 5, showing a plurality of object positions at a substantially equal range but having substantially different scanning angles, and the paths of the return beam for each object position according to an example embodiment of the present disclosure.

Typically, as shown in FIG. 4, a ray of the return beam 9 that passes through the centre of the collection lens 6 substantially perpendicularly will be transmitted without refraction to the collector 37. However, rays that do not pass through the lens 6 substantially perpendicularly will be refracted and focused by the collection lens 6 to a focal point that may not coincide with the collector 37. Because the angle of incidence $$\left(\frac{\beta}{2}\right)$$

on the surface of the object 10 varies inversely with the distance between the sensor 41 and the object 10, the angle at which the return beam 9 passes through the collection lens 6 (and thus the time of detection) also varies inversely as a function of the range to the object 10. Thus, especially with close objects 10, the return beam 9 passing through the collection lens 6 may not impinge on the collector 37 on its own. Accordingly, as shown in FIG. 6, in some example embodiments, the redirection element 36 is positioned relative to the collection lens 6 such that, in the case of close objects 10, at least a portion of the return beam 9b passes through the redirection element 36, and is redirected, by way of non-limiting example, by refraction, and onto the collector 37.

In some example embodiments, the redirection element 36 may be a diffuser positioned between the collection lens 6 and the collector 37 to intercept at least a portion of the return beam 9b and spread it laterally. Thus, even if the trajectory of the return beam 9b is such that the return beam 9, as it leaves the collection lens 6, is not aligned with the input of the collector 37, energy from the return beam 9b will be redirected laterally by the diffuser 36 so that a portion of the beam energy is incident on the collector 37. As appropriate, the power of the launch beam 8 may be adjusted to compensate for beam attenuation imparted by the diffuser 36.

In some example embodiments, the redirection element 36 may be a diffractive optical element (DOE) or holographic plate, which may be adapted to generate a beam pattern when illuminated by the return beam 9b. The beam pattern may include, by way of non-limiting example, a single and multiple lines, multiple dots, a single square, a dot matrix, a single circle, concentric circles and square grid(s) or other suitable pattern or any combination of any of them.

In some example embodiments, other devices suitable for laterally spreading or directing beam energy may serve as the redirecting element 36. By way of non-limiting example, an array of beam sensitive detectors may be used, recognizing that the capacitance of the array may slow the detector response, which may affect TOF readings.

In some example embodiments, the beam receiving section 46 may comprise a regulator (not shown) for regulating the amount of the return beam 9 input to the beam detection section 47, for example, to maintain a desired dynamic range of the signal power of the return beam 9b. In some example embodiments, such regulator (not shown) may be adapted to regulate the power as a function of beam position, which in turn is a function of the range to the object 10. At short range, the return beam 9b is relatively strong and the regulator (not shown) may be adapted to attenuate the return beam 9b to a greater extent than at long range, where the return beam 9a may be weaker. In some example embodiments, the regulator may comprise an implementation of the redirecting element 36 such that a lesser portion of the return beam 9 is directed toward the collector 37 as a function of the angle of refraction of the return beam 9 through the collection lens 6, or concomitantly, the lateral displacement of the return beam 9 after passing through the collection lens 6, by way of non-limiting example, by varying, as a function of lateral displacement, the amount of scattering or the gain adjustment in a single element or a series or elements that make up the redirecting element 36, such as, by way of non-limiting example, a gain or attenuation element or an optical fiber having different diameter, transmission coating, location of the fiber tip relative to the focal point, or any combination of any of these. In some example embodiments, the regulator (not shown) may comprise the diffuser, the DOE or other suitable device used as the redirecting element 36.

In some example embodiments, at least one folding mirror 38 may be respectively interposed in the path of the launch beam 8 between the radiation source 2 and the first reflecting surface 45a of the X-mirror 32 and in the path of the return beam 9 between the second reflecting surface 45b of the X-mirror 32 and the collection lens 6. In some example embodiments, the folding mirrors 38 are mounted at an angle of 45° to the incident beam 8, 9 to turn the beam 8, 9 through 90° although any suitable mounting angle may be employed. Thus, the launch beam 8 is introduced to the beam steering section 43 and the return beam 9 is introduced to the collection lens 6 along a plane generally transverse to the direction of the spacing between the X-mirror 32 and Y-mirror 34.

The folding mirrors 38 bring the launch beam 8 from beneath the optical base plate to above the optical base plate and bring the return beam 9 from above the optical base plate to beneath the optical base plate. This permits both the radiation source 2 and the collection lens 6 to be oriented in the Z-direction so as to reduce the height profile of the sensor 41, resulting in a flatter package for mounting beneath a moving vehicle (not shown) such as a satellite or helicopter. Additionally, the use of the folding mirrors 38 permit the optical base plate footprint to be, in some example embodiments, substantially 10.6"×5.1", which is substantially reduced from the optical base plate of the sensor 31. The space beneath the optical base plate is otherwise wasted space used to accommodate the galvanometer (not shown) for the X-mirror 32.

The collector 37 is in data communication with the processor 11. In some example embodiments, it is connected by an optical fiber 49 to minimize loss. It receives at least a portion of the return beam 9 from the collection lens 6, either directly or through the redirecting element 36, and provides a measurement of a characteristic of the return beam 9 to the processor 11. The collector 37 may comprise, in some example embodiments, an avalanche photo diode (APD) detector, a fiber tip or both.

In some example embodiments, the measurement is a time that at least a portion of the return beam 9 is detected by the collector 37. In some example embodiments, the measurement is a phase at detection of at least a portion of the return beam 9 detected by the collector 37.

The processor 11 is in data communication with the radiation source 2 and the collector 37. It receives a measurement of a characteristic of the launch beam 8 from the radiation source 2 and a measurement of a characteristic of the return beam 9 from the collector 37 and calculates an estimate of the range to the object 10 from these measurements.

In some example embodiments, the processor 11 is a TOF processor and it obtains time of launch and time of detection measurements of corresponding points in respectively the launch beam 8 and at least a portion of the return beam 9, to calculate the range using knowledge of the speed of light. In some example embodiments, the processor 11 is a phase processor and it obtains phase at launch and phase at detection measurements of corresponding points in respectively, the launch beam 8 and at least a portion of the return beam 9, to calculate the range.

Turning now to FIG. 6, three different lateral positions of the object 10, designated 10c, 10d and 10e respectively, having a common range R are shown, together with the launch beam 8 and the return beams 9c, 9d, 9e respectively incident on and reflected from the surface of the corresponding objects 10c, 10d, 10e. It may be seen that three different trajectories are generated as the return beam 9c, 9d, 9e, which reflect off the second reflecting surface 45b at the corresponding scanning angles of the X-mirror 32 and thereafter follow a common trajectory to pass through the collection lens 6 and in some example embodiments, the redirection element 36 at a different position and resulting in detection at the collector 37 at a common point in time. This permits a common range R to be calculated.

The three objects 10c, 10d, 10e are thus auto-synchronized by the sensor 41 and permits the return beam 9 to be detected by a small collector 37, which in some example embodiments may be 200 μm in diameter. Further the collector 37 will not necessarily be saturated by returns from nearby targets (not shown) or from internal scattering, resulting in improved performance.

In operation, the launch beam 8 is generated and processed by the beam generation section 42 and directed at the beam steering section 43 for impingement upon the surface of the object 10. Some of the scattered light is captured by the beam receiving section 46 as a return beam 9 and impinges on the collector 37. Measurements are taken by the processor 11 of at least one characteristic of corresponding points of the launch beam 8 and return beam 9 and processed to generate a range of the sensor 41 to the object 10.

Figure 7:
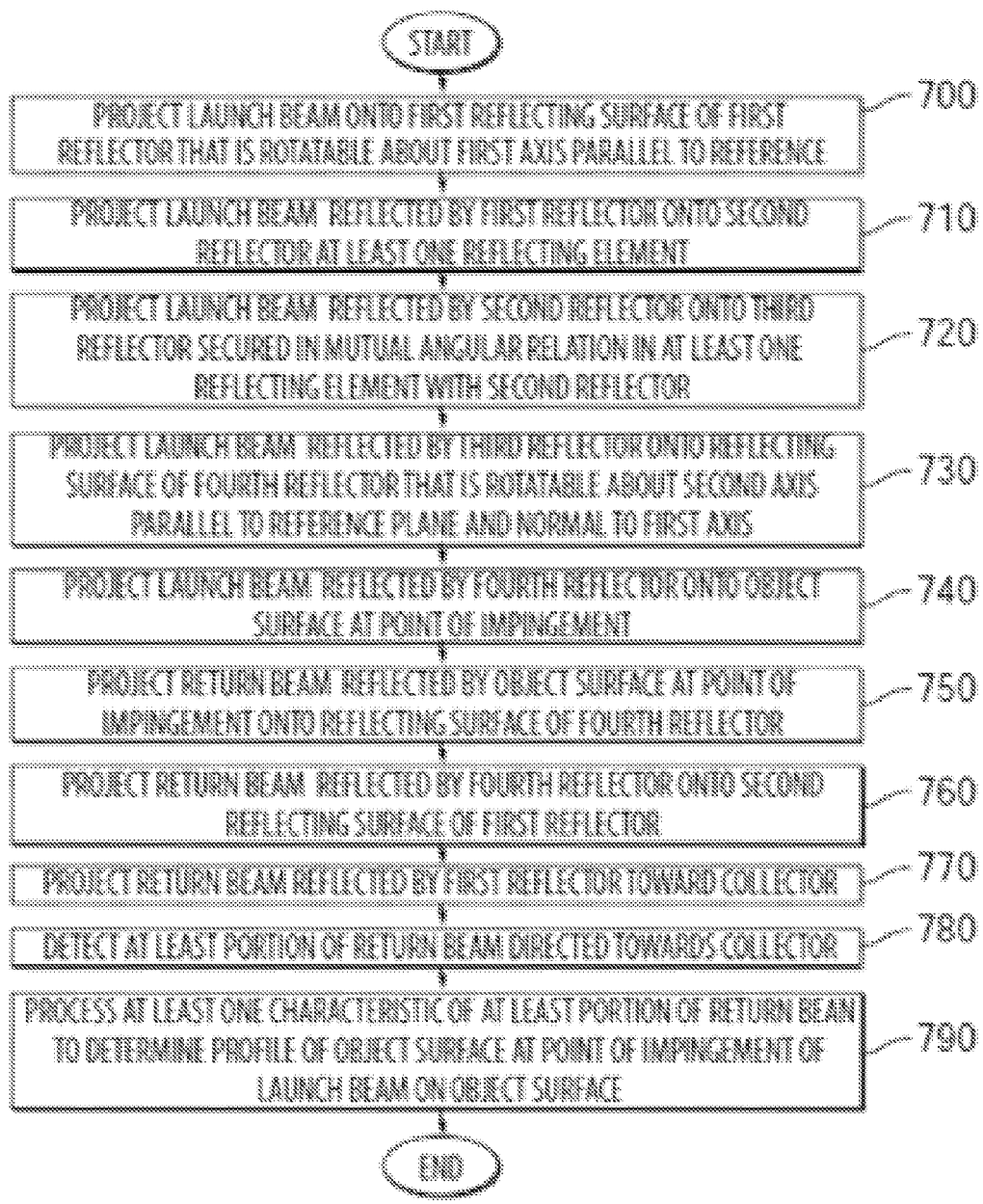
FIG. 7 is a flowchart illustrating example method actions of a method for determining a profile of a target surface relative to a reference plane in accordance with an example embodiment of the present disclosure.

Turning now to FIG. 7, a flow chart showing example processing actions of an example embodiment of a method for determining a profile of an object surface relative to a reference plane is shown.

Action 700 comprises projecting the launch beam 8 onto a planar first reflecting surface 45a of a first reflector (in this case X-mirror 32) that is rotatable about a first axis (Y-axis) substantially normal to the reference plane R.

Action 710 comprises projecting the launch beam 8 reflected by the first reflecting surface 45a of the first reflector 32 onto a planar reflecting surface of a second reflector, in this case, reflector 44a of at least one reflecting element 44.

Action 720 comprises projecting the launch beam 8 reflected by the reflecting surface of the second reflector 44a onto a planar reflecting surface of a third reflector 44b secured in mutual angular relation in the at least one reflecting element 44 with the second reflector 44a.

Action 730 comprises projecting the launch beam 8 reflected by the reflecting surface of the third reflector 44b onto a planar reflecting surface 48 of a fourth reflector (in this case Y-mirror 34) that is rotatable about a second axis (X-axis) substantially parallel to the reference plane R and substantially normal to the first axis (Y-axis).

Action 740 comprises projecting the launch beam reflected by the fourth reflector 34 onto the surface of the object 10 at a point of impingement.

Action 750 comprises projecting a return beam 9 reflected by the surface of the object 10 at the point of impingement onto the reflecting surface 48 of the fourth reflector 34.

Action 760 comprises projecting the return beam 9 reflected by the fourth reflector 34 onto a planar second reflecting surface 45b of the first reflector 32.

Action 770 comprises projecting the return beam 9 reflected by the second reflecting surface of the first reflector 32 toward a collector 37.

Action 780 comprises detecting at least a portion of the return beam 9 directed toward the collector 37.

Action 790 comprises processing at least one characteristic of at least a portion of the return beam 9 to determine the profile of the surface of the object 10 at the point of impingement of the launch beam 8 on the surface of the object 10.

Figure 8:
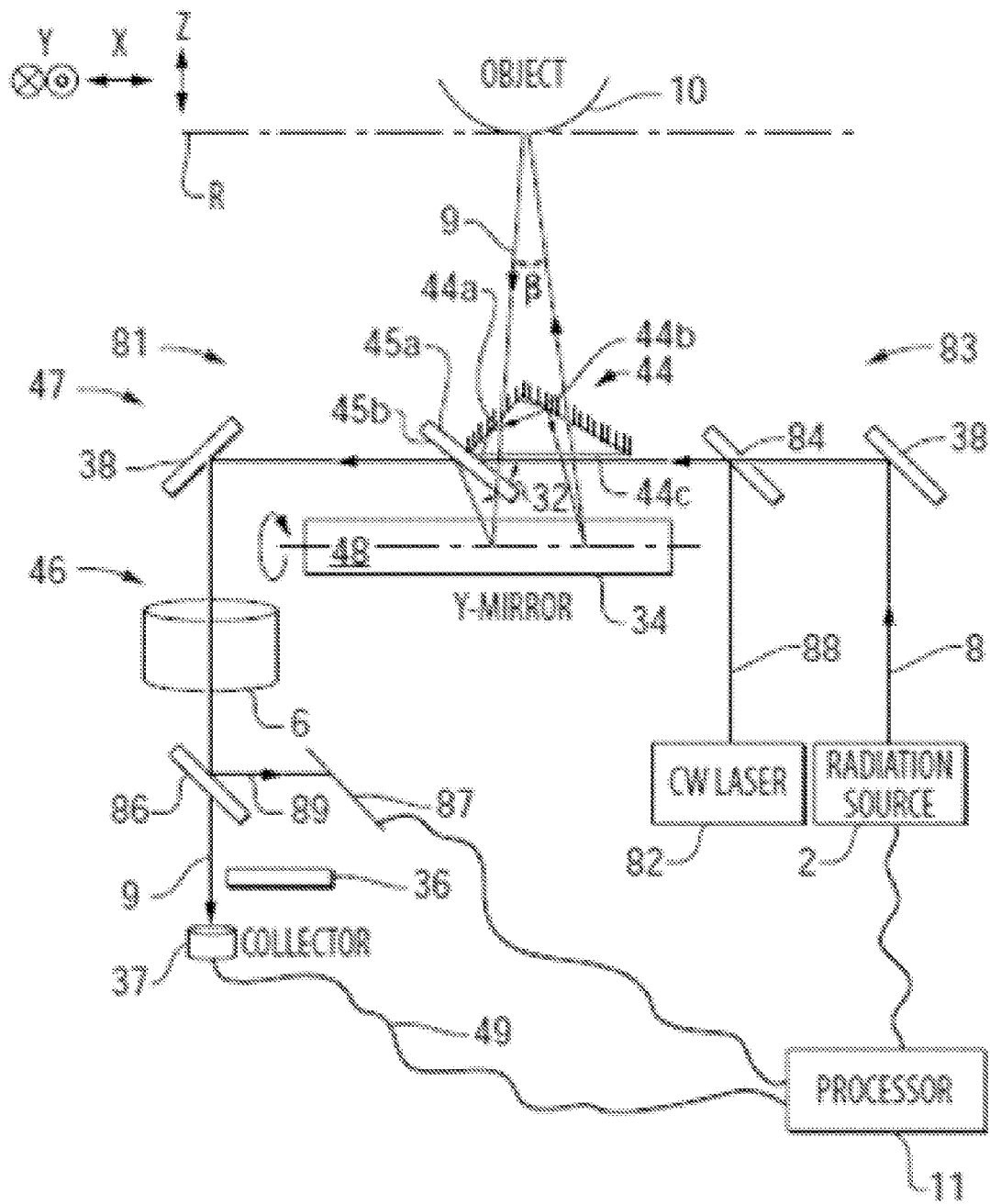
FIG. 8 is a schematic diagram of the optical ranging sensor of FIG. 5, in a combined LIDAR/triangulation configuration according to an example embodiment of the present disclosure.

Turning now to FIG. 8, there is shown an example embodiment of a LIDAR optical ranging sensor 81, in which the TOF or phase processing or both is supplemented by a triangulation capability. The sensor 81 enables the range between the sensor 81 and the object 10 to be measured for both long and short ranges and allows the range to be substantially continuously measured as the range changes from long to short range or vice versa.

In some example embodiments, long range measurements are still made using LIDAR based on the time (or, in some example embodiments, phase or both) difference between the first launch beam 8 and impingement of the return beam 9 corresponding to the first launch beam 8 at the collector 37.

In some example embodiments, the range may be determined using both techniques simultaneously or serially and a measurement from either technique may be selected, as appropriate, depending upon factors including without limitation the perceived accuracy of each technique for a given range.

In some example embodiments, range measurements may be taken substantially continuously as the range to the object 10 varies from long to short range or vice versa.

Depending upon the specific implementation of the sensor 81, range measurements may be substantially continuously taken from several kilometers to 1 mm or less.

In this example embodiment, the beam generation section 83 comprises, in addition to the radiation source 2, a second radiation source 82, such as a continuous wave (CW) laser. The second radiation source 82 generates a second launch beam 88 for impingement upon the surface of the object 10, whereby the return beam 89 corresponding thereto can be used for triangulation purposes.

In some example embodiments, the two launch beams 8, 88 have different frequencies and wavelengths to facilitate the beam detection section 49 discriminating between them. The second launch beam 88 may or may not lie in the optical spectrum.

In some example embodiments, the two launch beams 8, 88 may be generated initially from a single radiation source 2 using a suitable arrangement of optical elements including, without limitation a beam splitter, frequency modifier or any combination of these.

In some example embodiments, the second radiation source 82 may be the same as, identical or substantially similar to or different from the (first) radiation source 2. In some example embodiments, the second radiation source may be an HeNe continuous wave laser. In some example embodiments, the wavelength of the second launch beam 88 may be different from the wavelength of the first launch beam 8. In some example embodiments, the wavelength of the first launch beam 8 may be substantially 905 nm and the wavelength of the second launch beam may be substantially 1500 nm.

In some example embodiments, the second launch beam 88 may be treated by a beam conditioner (not shown) which may be the same as, identical or substantially similar to or different from the conditioner (not shown) for the first launch beam 8. Advantageously, the provision of independent beam conditioners (not shown) (including without limitation collimators (not shown)) may allow the size of the first launch beam 8 to be determined or controlled or both independently of the size of the second launch beam 88. As such, the beam size of the first launch beam 8, the second launch beam 88 may be varied so as to be optimized for the different ranging techniques in respect of which they were deployed. In some example embodiments, the second launch beam 88 has a smaller diameter than the first launch beam 8 so as to impart greater accuracy to the triangulation ranging measurement. In some example embodiments, the diameter of the first launch beam 8 may be substantially 20-30 mm, for example, 25 mm, while the diameter of the second launch beam 88 may be substantially between 4 and 10 mm, for example, 6 mm. In some example embodiments, the width of the second launch beam 88 may be fixed or variable. Provision of variable beam width capability may involve the use of a variable beam expander or other optical device.

In some example embodiments, focusing means (not shown) such as a lens device may be employed to focus the second launch beam 88 onto the object 10 in order to increase the accuracy of detection of a particular feature on the object 10 and to increase the resolution of the measured range between the sensor 81 and a particular point on the surface of the object 10. The focusing means (not shown) may allow the focal length of the second launch beam 88 to be varied. In some example embodiments, the focusing means (not shown) may be a fixed lens.

In some example embodiments, the beam generating section 83 may comprise means for generating a relatively wide second launch beam 88 and a focusing device for focusing the wide second launch beam 88 onto the object 10 with a relatively small size point of impingement, by way of non-limiting example, substantially less than 1 mm, for example, 500 nm or less, in order to increase the resolution of range and lateral measurements for ranging.

Examples of an apparatus for achieving higher resolution measurements are described in applicant's co-pending United States Patent Application Publication No. 2009/0195790 filed 9 Aug. 2006 and naming as inventors Zhu et al. ("Zhu No. 2"), which is incorporated by reference in its entirety herein.

In some example embodiments, the two launch beams 8, 88 may be directed generally in parallel, although in some example embodiments, only one of the launch beams 8, 88 may impinge upon a folding mirror 38 or similar component such as beam combiner 84 (discussed below). However, as discussed below, at some point, the two launch beams 8, 88 are made co-axial so as to share substantially the same optical path until impingement upon the surface of the object 10 at substantially a common point. This permits the range measurement obtained by LIDAR and by triangulation to occur substantially simultaneously at substantially the same point on the object 10. In this disclosure, the co-axial combination of the first launch beam 8 and the second launch beam 88 after having been transmitted through the dichroic filter 84 is referred to collectively as the launch beam 8.

In the example embodiment shown in FIG. 8, the beam steering section 83 comprises, in addition to the first reflecting surface 45a of the X-mirror 32, the reflecting surface 48 of the Y-mirror 34, the at least one element 44 comprising third and fourth reflecting surfaces 44a, 44b and if employed, at least one of the folding mirrors 37, a beam combiner 84 to render the first launch beam 8 and the second launch beam 88 substantially coaxial or coincident (as launch beam 8) that may be directed along the same path toward the object 10.

In some example embodiments, the first launch beam 8 and the second launch beam 88 are directed at the beam combiner 84 at substantially right angles to one another, which may comprise a wavelength selective element such as a dichroic filter. In some example embodiments, the first launch beam 8 is allowed to be transmitted through the beam combiner 84 by reason of having a wavelength for which the beam combiner 84 is transmissive while the second launch beam 88 is reflected off the surface of the beam combiner 84 by reason of having a wavelength for which the beam combiner 84 is reflective. In some example embodiments, the beam combiner 84 may be angled at substantially 45° relative to the direction of the second launch beam 88 to turn the second launch beam 88 through 90° and into or substantially parallel and proximate to the path of the first launch beam 8 for impingement on the first reflecting surface 45a of the X-mirror 32, and through the remainder of the beam steering section 83 until impingement on the surface of the object 10.

While in some example embodiments, the first launch beam 8 and the second launch beam SS may be spaced apart, arranging the first launch beam 8 and the second launch beam 88 to be coincident may simplify design and reduce cost of the beam steering section 83 as described previously and may allow for more compact implementation. Furthermore, using coincident first and second launch beams 8, 88 enables range measurements using the TOF (or phase or both) and the triangulation mechanisms to be taken from substantially the same or similar position on the object 10, which may be beneficial when comparing results from the two mechanisms, by way of non-limiting example, when the range to the object 10 is in a transition region between long and short range where one or the other mechanism may be considered more accurate.

In the example embodiment shown in FIG. 8, the beam detection section 47 comprises, in addition to the reflecting surface 48 of the Y-mirror 34, the second reflecting surface 45b of the Y-mirror 34, the collection lens 6, the redirecting element 36 and if employed, at least one of the folding mirrors 38, a beam separator 86 to divide the return beam 9 into two spatially separated components corresponding to the first launch beam 8 and the second launch beam 88. A first component, designated the first return beam 9, passes through the beam separator 86 onto the collector 37 as described previously. A second component, designated the second return beam 89, is reflected by the beam separator 86 onto a detector 87 to perform ranging by triangulation. In this disclosure, the co-axial combination of the first return beam 9 and the second return beam 89 before having passed through the beam separator 86 is referred to collectively as the return beam 9.

In some example embodiments, the differing wavelengths of the first launch beam 8 and the second launch beam 88 may be employed in the beam separator 86 to differentiate between the first return beam 9 and the second return beam 89, for example by employing a wavelength sensitive dichroic filter as the beam separator 86 to transmit the first return beam 9 through the beam separator 86 and on toward the collector 37 while reflecting the second return beam 89 at the dichroic filter 86 onto the detector 87.

The detector 87 detects the position of the reflected second return beam 89 and this information, together with the angular position of the X-mirror 32 is used to determine the range to the object 10.

The detector 87 may comprise an array of detectors or sensors that are sensitive to the reflected beam wavelength. In one example embodiment, the detector 87 may comprise an array of InGaAs detector elements or other photosensitive detectors. The detector 87 may be mounted at an angle to the Z-direction, so that the focal point of the second return beam 89 coincides with the surface of the detector 87 as the second return beam 89 changes position. The point of impingement of the peak energy of the second return beam 89 on the detector 87 may be used as the positioning for determining the range to the object 10.

In some example embodiments, short range measurements are made using the triangulation method. In this method, the angle β between the second launch beam 88 and the second return beam 89, and the corresponding position of the second return beam 89 on the detector 87, depends on the range between the sensor 81 and the surface of the object 10 from which the return beam 9 is reflected. As such, the range from the sensor 81 to the object 10 may be mathematically determined, for example by taking advantage of trigonometric relationships between a notional range vector (not shown), the angle β and the point of impingement of the second return beam 89 along the detector 87.

Figure 9:
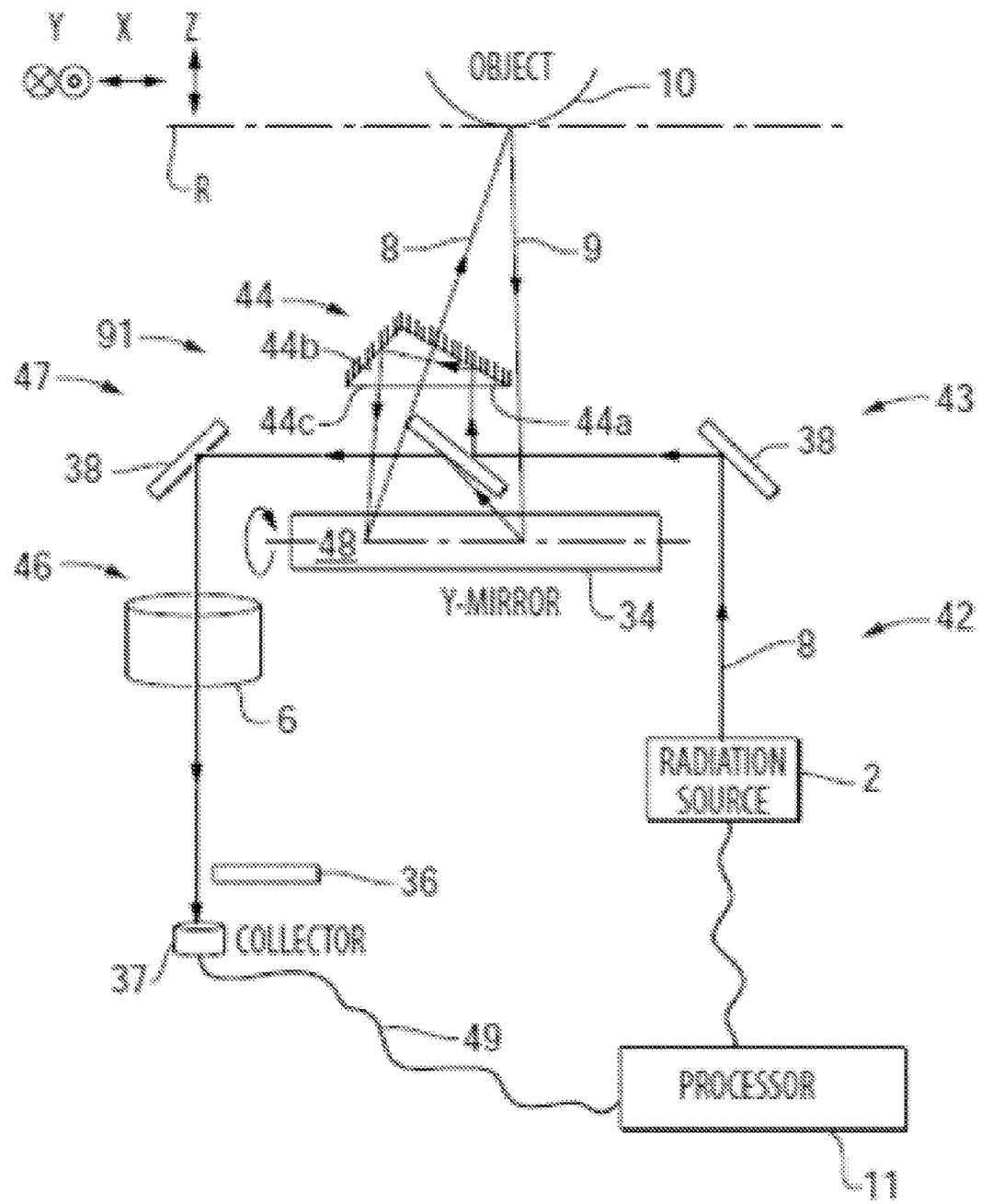
FIG. 9 is a schematic diagram of an example embodiment of an optical ranging sensor using a prism with no vertex proximate to an axis of rotation of the X-mirror.

Turning now to FIG. 9, there is shown a schematic diagram of an example embodiment of an optical ranging sensor 91. The sensor 91 has the same components as the sensor 41, but the prism 44 is oriented in a different fashion.

Comparison of both FIG. 4 and FIG. 9 will show that in both example embodiments: (a) the prism 44 is disposed so as to be impinged upon by the launch beam 8 between reflection off the first reflecting surface 45a of the X-mirror 32 and the reflecting surface 48 of the Y-mirror 34; (b) the third reflector 44a has a planar reflecting surface substantially parallel to the Y-axis for receiving the launch beam 8 after it is reflected off the first reflecting surface 45a of the X-mirror 32 and reflects it onto the fourth reflector 44b; (c) the fourth reflector 44b has a planar reflecting surface substantially parallel to the Y-axis, for receiving the launch beam 8 after it is reflected off the third reflector 44a and reflects it onto the reflecting surface 59 of the Y-mirror 34 for impingement onto the surface of the object 10; (d) the prism 44 is positioned between the X-mirror 32 and the reference plane R; (e) the hypotenusal face of the prism 44, which constitutes the refractive boundary 44c, lies parallel to the Y-axis, the axis of rotation of the Y-mirror 34 and the reference plane R; (f) the third and fourth reflectors 44a, 44b (respectively corresponding to the side of the prism 44 extending from the first acute vertex to the right angle vertex and the side of the prism 44 extending from the right angle vertex to the other acute vertex) are secured in mutual angular relation proximate and substantially to each other and lie between the refractive boundary 44c and the reference plane R; and (g) the first acute vertex is positioned between the right angled vertex and the axis of rotation of the X-mirror 32;

Whereas, in the example embodiment of FIG. 4, the prism 44 is positioned such that the first acute vertex of the prism 44 lies proximate to the axis of rotation of the X-mirror 32, in the example embodiment of FIG. 9, the first acute vertex of the prism 44 is not necessarily proximate to the axis of rotation of the X-mirror 32. Indeed, it may be spaced apart in the Z-direction (and in some example embodiments, in the X-direction) from the axis of rotation of the X-mirror 32. Furthermore, the orientation of the prism 44 in FIG. 9 may be such that the optical path from the third reflector 44a to the fourth reflector 44b may be in the Y-direction generally away from the folding mirror 37 and toward the folding mirror 38, which is reversed from the direction shown in example embodiment of FIG. 4.

However, in moving the first acute vertex of the prism 44 away from the axis of rotation of the X-mirror 32, the FOV of the sensor 91 may not exceed that achievable with the sensor 41, although in some example embodiments, it may still exceed the FOV achievable with the sensor 31.

Figure 10:
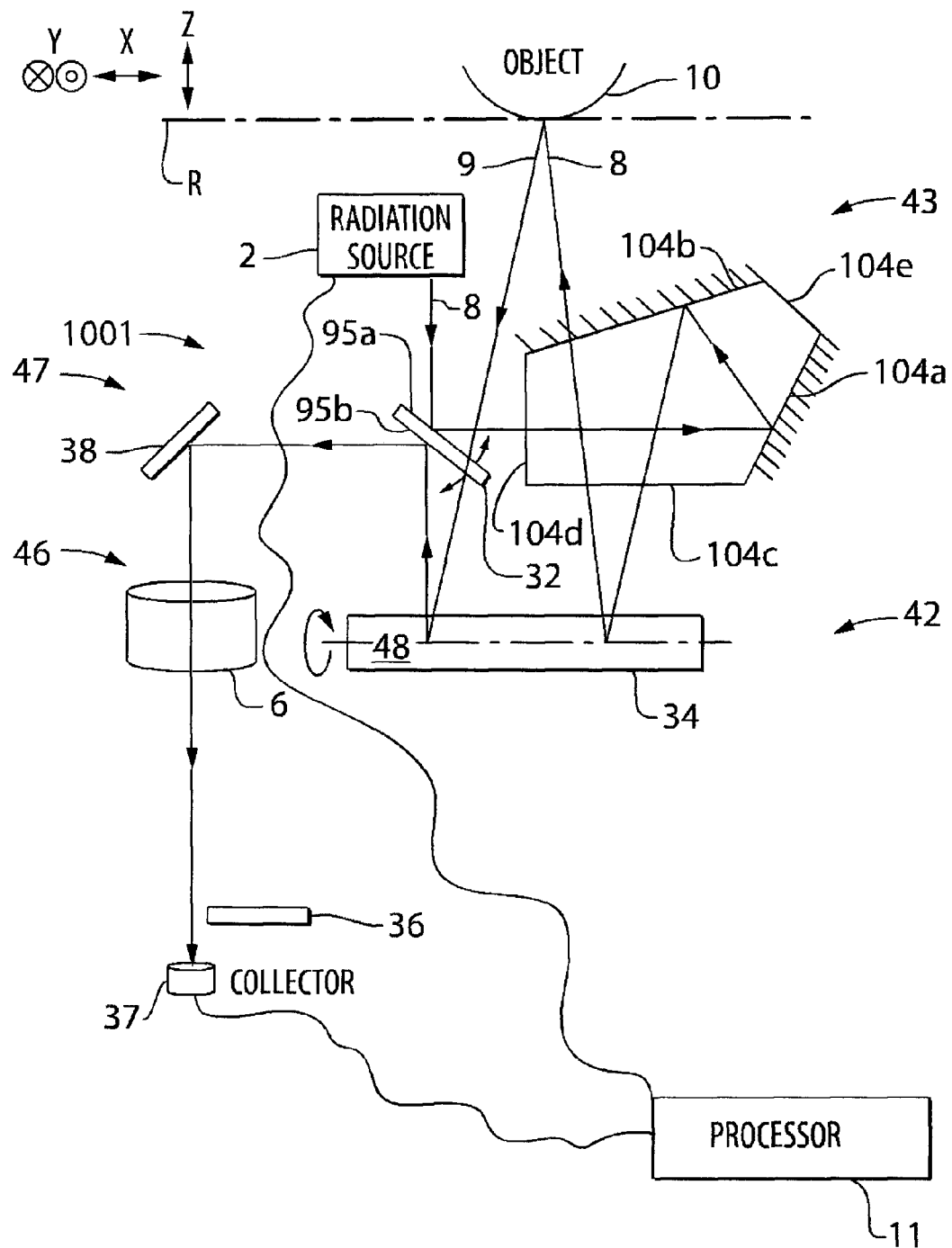
FIG. 10 is a schematic diagram of an example embodiment of an optical ranging sensor using a pentaprism in a first configuration and showing a plurality of object positions and the paths of the return beam for each object position.

Turning now to FIG. 10, there is shown a schematic diagram of an example embodiment of an optical ranging sensor 1001. The sensor 1001 employs a pentaprism (a five-sided reflecting prism that deviates a beam of light by substantially 90° by reflecting the beam within the pentaprism twice, allowing the transmission of the beam through a right angle without inversion as would be the case with a right angle prism or a mirror) 104 as the at least one reflective element 44 and positions it differently than the prism 44.

In some example embodiments, the pentaprism 104 is constructed of very high refractive index, by way of non-limiting example glass. In some example embodiments, two of the internal faces 104a, 104b of the sides of the pentaprism 104 that are not adjacent to the right angle vertex are coated to provide mirror surfaces to permit reflection even at an angle less than that which provides for total internal reflection. In some example embodiments, the two opposed transmitting faces 104c, 104d, which are adjacent to the right angle vertex are coated with an antireflection coating to reduce spurious reflections. In some example embodiments, the remaining face 104e is not used optically but truncates what would otherwise be an awkward angle joining the two mirrored faces.

Figure 10A:
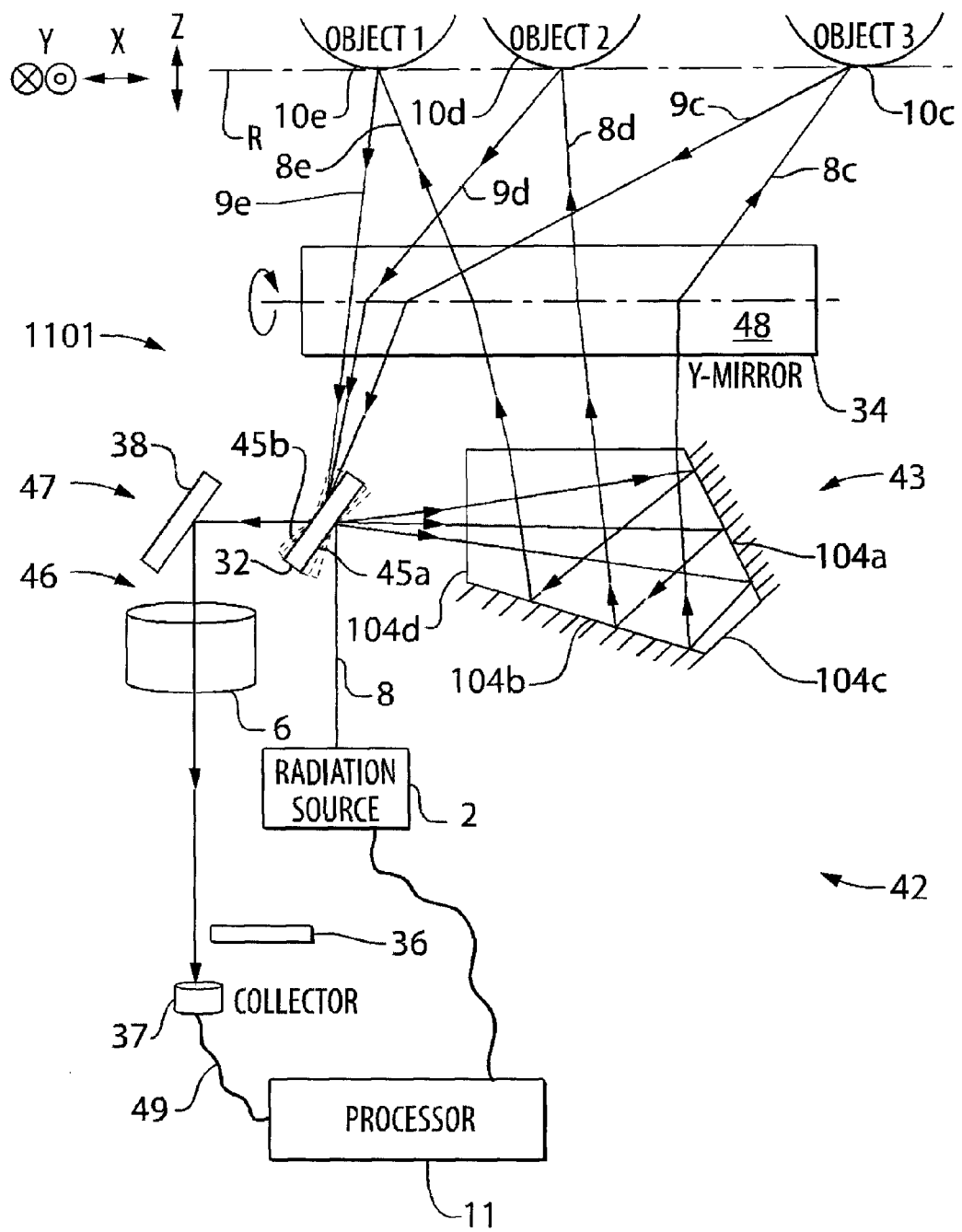
FIG. 10a is a schematic diagram of an example embodiment of an optical ranging sensor using a pentaprism in a second configuration and showing a plurality of object positions and the paths of the return beam for each object position.

FIG. 10a is a schematic diagram of an example embodiment of an optical ranging sensor 1001a using pentaprism 1004 in a second configuration and showing a plurality of object positions 10c, 10d, 10e and the paths of the return beam 9c, 9d, 9e for each object position.

The use of a pentaprism 1004 as the at least one reflective element dispenses with at least one folding mirror 38, which may permit a lower profile sensor 1001a than that of sensor 31 at the cost of employing asymmetrical bistatic scanning. However, even with the use of high refractive index materials, the FOV may not be substantially increased over that of sensor 31, and may not approach that achievable by sensor 41. However, in the illustrated configurations, the radiation source 2 is aligned such that the launch beam 8 emitted by it lies substantially parallel to the Z-axis. In such configurations, the profile of the sensor 101 may be larger than that available with the sensor 41 of FIG. 4.

Figure 11:
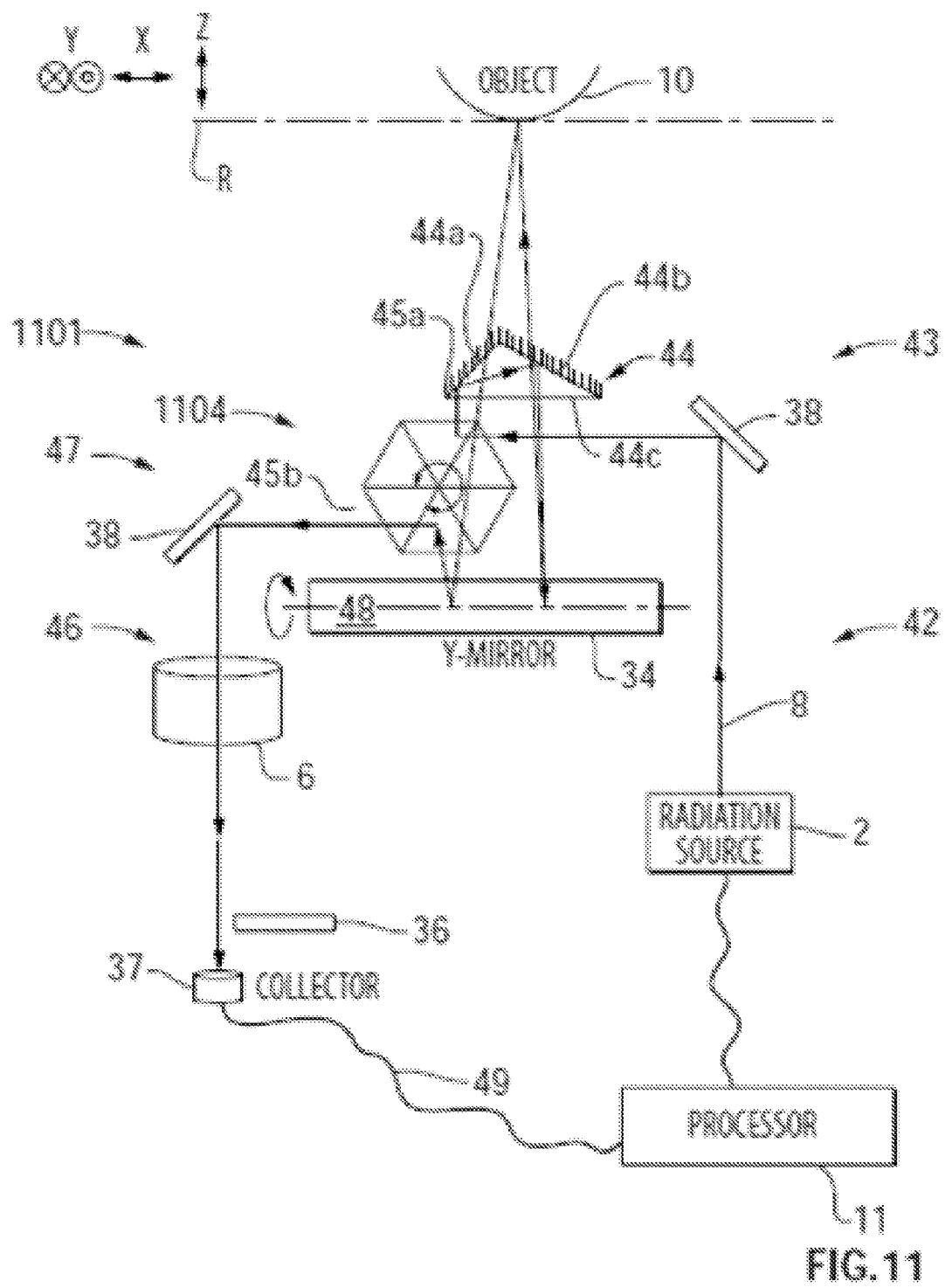
FIG. 11 is a schematic diagram of an example embodiment of an optical ranging sensor using a spinning mirror according to the present disclosure.

FIG. 11 is a schematic diagram of an example embodiment of an optical ranging sensor 1101 using a spinning mirror having a plurality of facets, in place of X-mirror 32. In some example embodiments, the number of facets is even. In some example embodiments, the number of facets exceeds 4. In some example embodiments, the spinning mirror is driven by a rotary motor (not shown). Because of the plurality of facets employed in the scanning mirror, the sensor 1101 may scan at a higher speed compared to sensor 41 or 31.

In some example embodiments (not shown), the spinning mirror may be a polygonic mirror (not shown) in which the plurality of facets are disposed in a regular polygonic profile, each having an axis that lies in a common plane. In such example embodiments, opposed and parallel facets of the polygonic mirror (not shown) may correspond go the first and second reflecting surfaces 45a, 45b of the X-mirror 32.

Figure 11A:
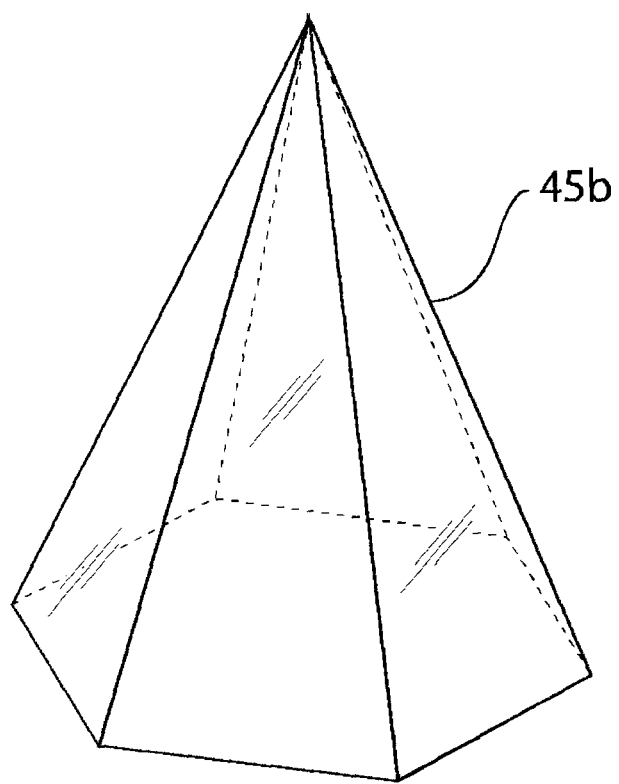
FIG. 11a is a perspective view of the spinning mirror of FIG. 11 according to an example embodiment of the present disclosure.

In some example embodiments, the spinning mirror 1104 may have a plurality of polygonic facets in a regular pyramidical profile, shown in greater detail in FIG. 11a, such that the axes of each facet do not lie in a common plane. Such pyramidical mirrors 1104 may provide additional benefits because the optical path of the launch beam 8, the optical path of the return beam 9 or both need not be constrained to lie entirely within a common plane.

In some example embodiments, the launch beam 8, the return beam 9 or either of them may arrive or depart at an angle (of substantially 90° or otherwise) to a plane in which the optical path of the launch beam 8 before impingement upon the Y-mirror 34 and the optical path of the return beam 9 after impingement upon the Y-mirror 34 lie, which in turn may facilitate a smaller overall size or profile or both to the sensor 1101.

In some example embodiments, the configuration shown in FIG. 11 could be modified by positioning the laser source 2 above the point of impingement of launch beam 8 on the spinning mirror 1104, dispensing with folding mirror 37. In some example embodiments, the configuration shown in FIG. 11 could be modified by positioning the lens 6 and the collector 7 above the point of impingement of return beam 9 on the spinning mirror 1104, dispensing with folding mirror 38.

It will be apparent that various modifications and variations may be made to the embodiments disclosed herein, consistent with the present disclosure, without departing from the spirit and scope of the present disclosure.

In the foregoing disclosure, for purposes of explanation and not limitation, specific details are set forth such as particular architectures, interfaces, techniques, etc. in order to provide a thorough understanding of the present disclosure.

While example embodiments are disclosed, this is not intended to be limiting. Rather, the general principles set forth herein are considered to be merely illustrative of the scope of the present disclosure and it is to be further understood that numerous changes covering alternatives, modifications and equivalents may be made without straying from the scope of the present disclosure, as defined by the appended claims.

For example, the various elements or components may be combined or integrated in another system or certain features may be omitted, or not implemented. Also, techniques, systems, subsystems and methods described and illustrated in the various embodiments as discrete or separate may be combined or integrated with other systems, modules, techniques, or methods without departing from the scope of the present disclosure. Other examples of changes, substitutions, and alterations are easily ascertainable and could be made without departing from the spirit and scope disclosed herein.

In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

By way of non-limiting example, any optical component described herein may be replaced by any other optical component that provides a similar function, operates in a similar way, has a similar structure, provides a similar result or any combination of any of them. By of non-limiting example, a prism may be replaced by any other suitable set of reflectors, such as mirrors. By way of non-limiting example, a mirror may be replaced by any other suitable component, such as a waveguide or light pipe or other component.

In some instances, detailed descriptions of well-known devices, circuits, and methods are omitted so as not to obscure the description of the present disclosure with unnecessary detail. All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated that block diagrams reproduced herein can represent conceptual views of illustrative components embodying the principles of the technology. Similarly, it will be appreciated that any flow charts, state transition diagrams, pseudocode, and the like represent various processes, which may be substantially represented in computer-readable medium and so executed by a computer or processor, whether or not such computer or processor is explicitly shown.

While the present disclosure is sometimes described in terms of methods, a person of ordinary skill in the art will understand that the present disclosure is also directed to various apparatus including components for performing at least some of the aspects and features of the described methods.

Certain terms are used throughout to refer to particular components. Manufacturers may refer to a component by different names. Use of a particular term or name is not intended to distinguish between components that differ in name but not in function.

The terms "including" and "comprising" are used in an open-ended fashion, and thus should be interpreted to mean "including, but not limited to". The terms "and "comprising" are used in a n open-ended fashion, and thus should be interpreted to mean should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

Directional terms such as "upward", "downward", "left" and "right" are used to refer to directions in the drawings to which reference is made unless otherwise stated. Similarly, words such as "inward" and "outward" are used to refer to directions toward and away from, respectively, the geometric center of a device, area or volume or designated parts thereof. Moreover, all dimensions described herein are intended solely to be by way of example for purposes of illustrating certain embodiments and are not intended to limit the scope of the disclosure to any embodiments that may depart from such dimensions as may be specified.

The terms "couple" or "communicate" in any form are intended to mean either a direct connection or indirect connection through some interface, device, intermediate component or connection, whether electrically, mechanically, chemically, or otherwise.

References in the singular form include the plural and vice versa, unless otherwise noted.

The purpose of the Abstract is to enable the relevant patent office or the public generally, skill in the art who are not familiar with patent or legal terms or phraseology, to quickly determine from a cursory inspection the nature of the technical disclosure. The Abstract is neither intended to define the scope of this disclosure, which is measured by its claims, nor is it intended to be limiting as to the scope of this disclosure in any way.

According to a first broad aspect of the present disclosure, there is disclosed a sensor for determining a profile of an object surface relative to a reference plane, comprising: a radiation source for projecting a launch beam for impingement onto the object surface; a collector for detecting at least a portion of a return beam reflected by the object surface; a processor for determining the profile of the object surface at a point of impingement of the launch beam onto the object surface from at least one characteristic of the at least a portion of the return beam; a first reflector having a first and second planar reflecting surfaces, the first reflecting surface for reflecting the launch beam along a first path, the second reflecting surface for reflecting the return beam along a second path, the first reflector being rotatable about a first axis substantially parallel to the reference plane, for controlling impingement of the launch beam on the object surface along a second axis substantially parallel to the reference plane and normal to the first axis; a second reflector having a planar reflecting surface for reflecting the launch beam onto the object surface and for reflecting the return beam arriving from the object surface, the second reflector being rotatable about the second axis for controlling impingement of the launch beam on the object surface along the first axis; at least one reflective element having third and fourth reflectors secured in mutual angular relation, the at least one reflective element disposed so as to be impinged upon by the launch beam between the first and second reflectors, the third reflector having a planar reflecting surface for receiving the launch beam after it is reflected off the first reflecting surface of the first reflector and reflecting it onto the fourth reflector, and the fourth reflector having a planar reflecting surface for reflecting the launch beam onto the reflecting surface of the second reflector for reflection onto the object surface.

In some example embodiments, the radiation source comprises a laser. In some example embodiments, the laser is pulsed. In some example embodiments, the radiation source comprises a beam modifier. In some example embodiments, the radiation source is an InGaAs near-infrared laser. In some example embodiments, the launch beam is launched using a waveguide. In some example embodiments, the radiation source comprises at least one collimator for collimating the launch beam. In some example embodiments, the radiation source comprises a beam expander for expanding the launch beam.

In some example embodiments, the sensor comprises at least one folding mirror for changing a direction of the launch beam before impingement on the first reflective surface of the first reflector. In some example embodiments, the at least one folding mirror changes the direction of the launch beam by substantially 90°. In some example embodiments, the radiation source emits the launch beam in a direction substantially parallel to the reference plane. In some example embodiments, the first reflecting surface is opposed and parallel to the second reflecting surface. In some example embodiments, the second path is parallel to and opposed in direction to the first path.

In some example embodiments, the first reflector is a spinning mirror having at least one other reflection surface in addition to the first and second reflecting surfaces. In some example embodiments, the at least one other reflecting surfaces are even in number. In some example embodiments, a total number of reflecting surfaces is selected from a group consisting of four and more than four.

In some example embodiments, the collector records a time of detection of the at least a portion of the return beam and the characteristic comprises the time of detection. In some example embodiments, the collector records a phase of the at least a portion of the return beam and the characteristic comprises the phase.

In some example embodiments, the sensor comprises a device for redirecting the at least a portion of the return beam toward the collector. In some example embodiments, the device for redirecting is selected from a group consisting of a spherical lens, a cylindrical lens, a diffuser, a diffractive element and any combination of any of these.

In some example embodiments, the collector determines a position along the collector where the at least a portion of the return beam is detected and the characteristic comprises the position where the at least a portion of the return beam is detected. In some example embodiments, the collector comprises at least one fiber receiver.

In some example embodiments, the sensor comprises at least one folding mirror for changing a direction of the return beam before impingement on the collector. In some example embodiments, the at least one folding mirror changes the direction of the return beam by substantially 90°. In some example embodiments, the return beam impinges on the collector in a direction substantially parallel to the reference plane.

In some example embodiments, the processor determines the profile of the object surface by calculating a time difference between a time of launch of the launch beam and a time of detection recorded by the collector. In some example embodiments, the processor determines the profile of the object surface by calculating a phase difference between a launch phase of the launch beam and a phase recorded by the collector. In some example embodiments, the processor determines the profile of the object surface by calculating an angle of incidence of the launch beam on the object surface relative to the reference plane. In some example embodiments, the processor controls rotation of the first reflector to move a point of impingement of the launch beam on the object surface along the second axis. In some example embodiments, the processor controls rotation of the second reflector to move a point of impingement of the launch beam on the target surface along the first axis.

In some example embodiments, the first reflector comprises a first driving element for rotating the first reflector. In some example embodiments, the second reflector comprises a second driving element for rotating the second reflector. In some example embodiments, a first end of the third reflector is positioned proximate to the first axis of the first reflector. In some example embodiments, a second end of the third reflector is positioned between the first end of the third reflector and the reference plane. In some example embodiments, the first end of the third reflector is positioned between the second end of the third reflector and the first axis. In some example embodiments, the second end of the third reflector is proximate to a first end of the fourth reflector. In some example embodiments, the reflecting surfaces of the third and fourth reflectors are substantially normal to each other.

In some example embodiments, the at least one reflective element comprises a refractive boundary, through which the launch beam passes after reflection off the fourth reflector and before reflection onto the object surface. In some example embodiments, the refractive boundary causes the launch beam, if incident on the refractive boundary at an angle to a normal axis of the boundary, to be refracted through the boundary at an increased angle. In some example embodiments, the refractive boundary is substantially parallel to the reference plane. In some example embodiments, the refractive boundary extends between a first end of the third reflector positioned proximate to the first axis of the first reflector and a second end of the fourth reflector, a second end of the third reflector and a first end of the fourth reflector being proximate to each other. In some example embodiments, the refractive boundary is substantially parallel to the second axis. In some example embodiments, the at least one reflective element is a prism. In some example embodiments, the prism is a pentaprism.

In some example embodiments, the at least one reflective element comprises a pair of reflecting mirrors. In some example embodiments, the sensor is transportable on a movable platform for determining a range from the movable platform to the point of impingement on the object surface.

According to a second broad aspect of the present disclosure, there is disclosed a method for determining a profile of a object surface relative to a reference plane, comprising: projecting a launch beam onto a planar first reflecting surface of a first reflector that is rotatable about a first axis substantially parallel to the reference plane; projecting the launch beam reflected by the first reflecting surface of the first reflector onto a planar reflecting surface of a second reflector of at least one reflecting element; projecting the launch beam reflected by the reflecting surface of the second reflector onto a planar reflecting surface of a third reflector secured in mutual angular relation in the at least one reflecting element with the second reflector; projecting the launch beam reflected by the reflecting surface of the third reflector onto a planar reflecting surface of a fourth reflector that is rotatable about a second axis substantially parallel to the reference plane and substantially normal to the first axis; projecting the launch beam reflected by the reflecting surface of the fourth reflector onto the object surface at a point of impingement; projecting a return beam reflected by the object surface at the point of impingement onto the reflecting surface of the fourth reflector; projecting the return beam reflected by the reflecting surface of the fourth reflector onto a planar second reflecting surface of the first reflector; projecting the return beam reflected by the second reflecting surface of the first reflector toward a collector; detecting at least a portion of the return beam directed toward the collector; and processing at least one characteristic of at least a portion of the return beam to determine the profile of the object surface at the point of impingement of the launch beam on the object surface.

In some example embodiments, the characteristic comprises a time of detection of the at least a portion of the return beam and the action of processing comprises calculating a time difference between a time of launch of the launch beam and the time of detection. In some example embodiments, the characteristic comprises a phase of the at least a portion of the return beam and the action of processing comprises calculating a phase difference between a launch phase of the launch beam and the phase of the at least a portion of the return beam. In some example embodiments, the characteristic comprises a position along the collector where the at least a portion of the return beam is detected and the action of processing comprises calculating an angle of incidence of the launch beam on the object surface relative to the reference plane.

In some example embodiments, the method comprises controlling rotation of the first reflector to move the point of impingement of the launch beam on the object surface along the second axis. In some example embodiments, the method comprises controlling rotation of the fourth reflector to move the point of impingement of the launch beam on the object surface along the first axis. In some example embodiments, the method comprises refracting the launch beam reflected from the reflecting surface of the third reflector through a refractive boundary of the at least one reflective element before projecting it onto the reflecting surface of the fourth reflector. In some example embodiments, the launch beam, if incident on the refractive boundary at an angle to a normal axis of the boundary, is refracted through the boundary at an increased angle.

Other embodiments consistent with the present disclosure will be apparent from consideration of the specification and the practice of the disclosure disclosed herein. Accordingly the specification and the embodiments disclosed therein are to be considered examples only, with a true scope and spirit of the disclosure being disclosed by the following numbered claims:

What is claimed is:

1. A sensor for determining a profile of an object surface relative to a reference plane, comprising:
    a radiation source for projecting a launch beam for impingement onto the object surface;
    a collector for detecting at least a portion of a return beam reflected by the object surface;
    a processor for determining the profile of the object surface at a point of impingement of the launch beam onto the object surface from at least one characteristic of the at least a portion of the return beam;
    a first reflector having first and second planar reflecting surfaces, the first reflecting surface for reflecting the launch beam along a first path, the second reflecting surface for reflecting the return beam along a second path, the first reflector being rotatable about a first axis substantially parallel to the reference plane, for controlling impingement of the launch beam on the object surface along a second axis substantially parallel to the reference plane and normal to the first axis;
    a second reflector having a planar reflecting surface for reflecting the launch beam onto the object surface and for reflecting the return beam arriving from the object surface, the second reflector being rotatable about the second axis for controlling impingement of the launch beam on the object surface along the first axis;
    at least one reflective element having third and fourth reflectors secured in mutual angular relation, the at least one reflective element disposed so as to be impinged upon by the launch beam between the first and second reflectors, the third reflector having a planar reflecting surface for receiving the launch beam after it is reflected off the first reflecting surface of the first reflector and reflecting it onto the fourth reflector, and the fourth reflector having a planar reflecting surface for reflecting the launch beam onto the reflecting surface of the second reflector for reflection onto the object surface.

2. A sensor according to claim 1, wherein the first reflector is a spinning mirror having at least one other reflecting surface in addition to the first and second reflecting surfaces.

3. A sensor according to claim 1, the first reflector rotatable under control of the processor to move a point of impingement of the launch beam on the object surface along the second axis.

4. A sensor according to claim 1, the second reflector rotatable under control of the processor to move a point of impingement of the launch beam on the target surface along the first axis.

5. A sensor according to claim 1, wherein a first end of the third reflector is positioned proximate to the first axis of the first reflector.

6. A sensor according to claim 5, wherein a second end of the third reflector is positioned between the first end of the third reflector and the reference plane.

7. A sensor according to claim 6, wherein the first end of the third reflector is positioned between the second end of the third reflector and the first axis.

8. A sensor according to claim 6, wherein the second end of the third reflector is proximate to a first end of the fourth reflector.

9. A sensor according to claim 1, wherein the reflecting surfaces of the third and fourth reflectors are substantially normal to each other.

10. A sensor according to claim 1, wherein the at least one reflective element comprises a refractive boundary, through which the launch beam passes after reflection off the fourth reflector and before reflection onto the object surface.

11. A sensor according to claim 10, wherein the refractive boundary causes the launch beam, if incident on the refractive boundary at an angle to a normal axis of the boundary, to be refracted through the boundary at an increased angle.

12. A sensor according to claim 10, wherein the refractive boundary is substantially parallel to the reference plane.

13. A sensor according to claim 10, wherein the refractive boundary extends between a first end of the third reflector positioned proximate to the first axis of the first reflector and a second end of the fourth reflector, a second end of the third reflector and a first end of the fourth reflector being proximate to each other.

14. A sensor according to claim 10, wherein the refractive boundary is substantially parallel to the second axis.

15. A sensor according to claim 1, wherein the at least one reflective element is a prism.

16. A sensor according to claim 15, wherein the prism is a pentaprism.

17. A method for determining a profile of a object surface relative to a reference plane, comprising:
    projecting a launch beam onto a planar first reflecting surface of a first reflector that is rotatable about a first axis substantially parallel to the reference plane;

projecting the launch beam reflected by the first reflecting surface of the first reflector onto a planar reflecting surface of a second reflector of at least one reflecting element;

projecting the launch beam reflected by the reflecting surface of the second reflector onto a planar reflecting surface of a third reflector secured in mutual angular relation in the at least one reflecting element with the second reflector;

projecting the launch beam reflected by the reflecting surface of the third reflector onto a planar reflecting surface of a fourth reflector that is rotatable about a second axis substantially parallel to the reference plane and substantially normal to the first axis;

projecting the launch beam reflected by the reflecting surface of the fourth reflector onto the object surface at a point of impingement;

projecting a return beam reflected by the object surface at the point of impingement onto the reflecting surface of the fourth reflector;

projecting the return beam reflected by the reflecting surface of the fourth reflector onto a planar second reflecting surface of the first reflector;

projecting the return beam reflected by the second reflecting surface of the first reflector toward a collector;

detecting at least a portion of the return beam directed toward the collector; and processing at least one characteristic of at least a portion of the return beam to determine the profile of the object surface at the point of impingement of the launch beam on the object surface.

18. A method according to claim 17, further comprising controlling rotation of the first reflector to move the point of impingement of the launch beam on the object surface along the second axis.

19. A method according to claim 17, further comprising controlling rotation of the fourth reflector to move the point of impingement of the launch beam on the object surface along the first axis.

20. A method according to claim 17, further comprising refracting the launch beam reflected from the reflecting surface of the third reflector through a refractive boundary of the at least one reflective element before projecting it onto the reflecting surface of the fourth reflector.

* * * * *